US008068271B2

(12) United States Patent
Lipovetskaya et al.

(10) Patent No.: US 8,068,271 B2
(45) Date of Patent: Nov. 29, 2011

(54) ROTATING ELEMENT TRANSMISSIVE DISPLAYS

(75) Inventors: Yelena Lipovetskaya, Santa Barbara, CA (US); Brian Gobrogge, Grand Rapids, MI (US)

(73) Assignee: Cospheric LLC, Santa Barbara, CA (US)

( * ) Notice: Subject to any disclaimer, the term of this patent is extended or adjusted under 35 U.S.C. 154(b) by 0 days.

(21) Appl. No.: 12/579,271

(22) Filed: Oct. 14, 2009

(65) Prior Publication Data

US 2010/0097687 A1    Apr. 22, 2010

Related U.S. Application Data

(60) Provisional application No. 61/107,605, filed on Oct. 22, 2008.

(51) Int. Cl.
G02B 26/00 (2006.01)
G02F 1/03 (2006.01)
G09G 3/34 (2006.01)
G03G 13/00 (2006.01)

(52) U.S. Cl. .......... 359/296; 359/245; 345/107; 430/31
(58) Field of Classification Search .......... 359/296, 359/245, 253–254, 265, 290–291; 349/33; 345/107; 430/31–32
See application file for complete search history.

(56) References Cited

U.S. PATENT DOCUMENTS

| 4,126,854 A | 11/1978 | Sheridon |
| 4,143,103 A | 3/1979 | Sheridon |
| 4,261,653 A | 4/1981 | Goodrich |
| 4,438,160 A | 3/1984 | Ishikawa et al. |
| 4,810,431 A | 3/1989 | Leidner |
| 5,344,594 A | 9/1994 | Sheridon |
| 5,708,525 A | 1/1998 | Sheridon |
| 5,737,115 A | 4/1998 | Mackinlay et al. |
| 5,751,268 A | 5/1998 | Sheridon |
| 5,754,332 A | 5/1998 | Crowley |
| 5,760,761 A | 6/1998 | Sheridon |
| 5,767,826 A | 6/1998 | Sheridon |
| 5,777,782 A | 7/1998 | Sheridon |

(Continued)

FOREIGN PATENT DOCUMENTS

EP    0935230    8/1999

(Continued)

OTHER PUBLICATIONS

International Search Report and Written Opinion mailed on Apr. 17, 2008 for PCT/US2007/080842.

(Continued)

Primary Examiner — Dawayne Pinkney
(74) Attorney, Agent, or Firm — Weaver Austin Villeneuve & Sampson LLP

(57) ABSTRACT

A transmissive electro-optic display includes a substantially transparent front plane and back plane element. The back plane element includes a plurality of electrodes distributed in two dimensions on the backplane, each allowing independent control of a discrete region of the display. The front plane element includes at least one electrode disposed opposite the back plane, and is spaced apart from the back plane element by an interior wall defining a plurality of cells therebetween. A plurality of partially conductive and optically anisotropic elements is rotatably disposed in the plurality of cells, together with a dielectric fluid. When an appropriate electric field and/or a magnetic field is applied to the cells, the corresponding anisotropic elements are caused rotate between a "transmissive" state and an "opaque" state.

18 Claims, 8 Drawing Sheets

U.S. PATENT DOCUMENTS

| | | |
|---|---|---|
| 5,808,783 A | 9/1998 | Crowley |
| 5,815,306 A | 9/1998 | Sheridon et al. |
| 5,892,497 A | 4/1999 | Robertson |
| 5,914,805 A | 6/1999 | Crowley |
| 5,917,646 A | 6/1999 | Sheridon |
| 5,930,026 A | 7/1999 | Jacobson et al. |
| 5,982,346 A | 11/1999 | Sheridon et al. |
| 5,989,629 A | 11/1999 | Sacripante et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,162,321 A | 12/2000 | Silverman |
| 6,222,513 B1 | 4/2001 | Howard et al. |
| 6,379,856 B2 | 4/2002 | Sokol et al. |
| 6,428,868 B1 | 8/2002 | Sheridon et al. |
| 6,441,946 B1 | 8/2002 | Sheridon |
| 6,445,490 B1 | 9/2002 | Chopra et al. |
| 6,459,200 B1 | 10/2002 | Moore |
| 6,462,859 B1 | 10/2002 | Bastiaens et al. |
| 6,487,002 B1 | 11/2002 | Biegelsen |
| 6,498,674 B1 | 12/2002 | Sheridon |
| 6,549,327 B2 * | 4/2003 | Foucher et al. .......... 359/296 |
| 6,577,432 B2 | 6/2003 | Engler et al. |
| 6,672,921 B1 | 1/2004 | Liang et al. |
| 6,693,620 B1 | 2/2004 | Herb et al. |
| 6,727,881 B1 | 4/2004 | Albert et al. |
| 6,750,844 B2 | 6/2004 | Nakanishi |
| 6,788,452 B2 | 9/2004 | Liang et al. |
| 6,795,229 B2 | 9/2004 | Liang et al. |
| 6,839,158 B2 | 1/2005 | Albert et al. |
| 6,850,355 B2 | 2/2005 | Liang et al. |
| 6,956,690 B2 | 10/2005 | Yu et al. |
| 6,970,154 B2 | 11/2005 | Sheridon |
| 6,987,603 B2 | 1/2006 | Paolini, Jr. et al. |
| 7,057,599 B2 | 6/2006 | Engler et al. |
| 7,071,895 B2 | 7/2006 | Wampler |
| 7,075,502 B1 | 7/2006 | Drzaic et al. |
| 7,116,466 B2 | 10/2006 | Whitesides et al. |
| 7,167,155 B1 | 1/2007 | Albert et al. |
| 7,177,067 B1 | 2/2007 | Sakamoto |
| 7,184,197 B2 | 2/2007 | Liang et al. |
| 7,271,947 B2 | 9/2007 | Liang et al. |
| 7,312,916 B2 * | 12/2007 | Pullen et al. .......... 359/296 |
| 7,369,299 B2 | 5/2008 | Sakurai et al. |
| 2002/0106847 A1 | 8/2002 | Kazlas et al. |
| 2002/0140133 A1 | 10/2002 | Moore |
| 2004/0179146 A1 | 9/2004 | Nilsson |
| 2006/0050363 A1 | 3/2006 | Chopra et al. |
| 2008/0100907 A1 | 5/2008 | Lipovetskaya et al. |
| 2009/0231251 A1 | 9/2009 | Shoji |
| 2010/0035377 A1 | 2/2010 | Gobrogge et al. |

FOREIGN PATENT DOCUMENTS

| | | |
|---|---|---|
| WO | WO/02/29485 | 4/2002 |
| WO | WO2008/045891 | 4/2008 |
| WO | WO2008/080066 | 7/2008 |

OTHER PUBLICATIONS

Lipovetskaya et al., U.S. Appl. No. 12/004,746, entitled "Hemispherical Coating Method for Micro-Elements", filed Dec. 21, 2007.

US Office Action mailed Mar. 9, 2010, from U.S. Appl. No. 11/973,883.

US Final Office Action mailed Oct. 5, 2010, from U.S. Appl. No. 11/973,883.

International Search Report and Written Opinion mailed May 15, 2008, for Application No. PCT/US2007/088567.

US Notice of Allowance mailed Dec. 15, 2010, from U.S. Appl. No. 11/973,883.

US Final Office Action mailed Dec. 27, 2010, from U.S. Appl. No. 12/790,590.

U.S. Advisory Action mailed Apr. 4, 2011, from U.S. Appl. No. 12/790,590.

* cited by examiner

ROTATING ELEMENT TRANSMISSIVE DISPLAYS

CROSS-REFERENCE TO RELATED APPLICATIONS

This application claims the benefit of prior U.S. Provisional Application No. 61/107,605 filed Oct. 22, 2008, titled "Rotating Element Transmissive Displays" naming Lipovetskaya et al. as inventors, which is herein incorporated by reference in its entirety and for all purposes.

FIELD OF THE INVENTION

The present invention relates to electro-optic displays, and more specifically, relates to transmissive electro-optic displays with rotating elements.

BACKGROUND OF THE INVENTION

Visual displays that make use of ambient light to illuminate their pixels (most generally reflective) and that produce an image that is indefinitely stable in the absence of electrical input are often referred to as electronic paper, since they mimic some of the most advantageous properties of paper. Just like white paper that reflects and scatters incident light and does not require additional light sources for viewing the images printed upon it, electronic paper displays reflect and scatter ambient light in the white or light colored areas (often image-free areas) and absorb light in the black or dark color areas (often where the image appears). Thus, an electronic paper display can provide images that are viewable in the absence of backlight or pixel emission illumination (e.g., light emitting diode pixels). The absence of backlight makes such displays more pleasing to the eye, since the appearance of an image on such display resembles the appearance of an image on a sheet of paper. Further, since a backlight source is not required for these displays, they can be manufactured in less bulky, thin forms that may also possess some paper-like flexibility.

Electronic paper displays may also be bistable. Bistability refers to the ability of an image to remain stable in the absence of external stimuli (e.g., an applied electric potential). In bistable displays, the states of individual pixels (e.g., whether the pixels are light or dark) remain intact for long periods of time when no external potential is applied to the display. Therefore, images can be stored on bistable displays for a prolonged time without the need for continuous application of power, much like images stored on paper. This makes bistable displays especially appealing for portable-display applications. Further, since power is consumed by bistable displays only when the image is changed, these displays are more economical for some applications than conventional LCD and CRT displays. In CRT displays, for instance, the image needs to be constantly refreshed. While low refresh rates can conserve some power, this often results in flickering of the display and consequent eye strain of the viewer.

The image on the electronic paper display can be changed when desired, allowing a variety of applications for such displays. In one example, such displays serve as "reusable paper" for displaying still images. In other examples, they are used to display real-time moving imagery in video applications.

The first electronic displays with paper-like properties were developed in the 1970s at Xerox's Palo Alto Research Center. These displays, often referred to as "Gyricon" displays, are based on rotation of optically and electrically anisotropic spheres embedded in an elastomer. In one example of a Gyricon display, each sphere is composed of negatively charged black wax or plastic on one side and positively charged white wax or plastic on the other side. Each sphere is suspended in a dielectric fluid contained within a cavity formed in a plasticized elastomer. Each sphere is free to rotate in the fluid so that it could turn with black or white side to the viewer, thus providing a pixel with a black or white appearance. When an appropriate voltage is applied to the electrodes addressing selected spheres, the spheres rotate in accordance with their dipole moment and display an image to the viewer.

Gyricon technology for the most part, however, has only been practically applied to reflective based displays. In general, however, no effective manufacturing process has been developed that produces light valves (balls) with crisp transmissive/opaque regions.

The brightness and contrast of displayed images on these rotating element reflective based displays is primarily determined by the maximum reflectance that a display may attain. The overall reflectance of the display is influenced by the quality of optically and electrically anisotropic spheres as well as by optical properties of the material filling the gaps between individual spheres. Improved reflective versions of gyricon displays, thus, have evolved as described in U.S. Pat. Nos. 5,754,332 issued to Crowley et al., and 5,815,306 issued to Sheridon et al. More recent improvements to the electronic paper displays have further improved the overall reflectance that is comparable to that of paper. One such invention is embodied in our U.S. patent application Ser. No. 11/973,883, to Lipovetskaya and Gobrogge, filed Oct. 9, 2007, and entitled "ELECTRO-OPTIC DISPLAY", and herein incorporated by reference in its entirety. In general, this new design features an improve matrix having cells arranged in a square or hexagonal close packed patterns which significantly increase the density of the rotating elements, thus, improving reflectance. Another such improvement includes U.S. patent application Ser. No. 11/625,904, to Shieh and Lee, filed Jan. 23, 2007, and entitled "RECONFIGURABLE COLOR SIGNAGE USING BISTABLE LIGHT VALVE", and herein incorporated by reference in its entirety.

While these more recent improvements to the gyricon displays all offer improved reflectance characteristics, thus improving brightness and contrast, these reflective-based displays are still not comparable to that of transmissive based displays. Accordingly, there is a need for a rotating element type, transmissive based display that can provide bright, high-contrast images. It should be suitable for viewing both still and moving imagery, and should allow fabrication in thin and flexible forms. In addition, such display should preferably be robust and environmentally stable, e.g., it should be capable to withstand high-temperature and high-humidity conditions.

SUMMARY OF THE INVENTION

The present invention provides various improvements over known electronic paper, and particularly over rotational element-type Gyricon displays. In particular a rotating element-type display assembly is provided that is transmissive in nature as compared to the typical reflectance-type Gyricon displays. The transmissive display assembly of the present invention includes a substantially transparent back plane element having a plurality of electrodes distributed in two dimensions on the backplane. Each electrode allows independent control of a discrete region of the display. The assembly further includes a substantially transparent front plane element disposed substantially parallel and adjacent the back plane element. The front plane element includes at least one electrode disposed opposite the back plane, and is spaced apart from the back plane element by an interior wall defining a plurality of cells therebetween. The display assembly further includes a plurality of anisotropic elements rotatably disposed in the plurality of cells, and a dielectric fluid that enables the anisotropic elements to rotate between a first orientation and a second orientation within their respective cells when one of an electric field and a magnetic field is applied to the cells.

The first orientation, which is rotated substantially about ±90° relative to the second orientation, corresponds to a "transmissive" state wherein the respective rotating anisotropic element is oriented to permit the passage of backlight therethrough from the back plane electrode to the front plane electrode of the display assembly. In contrast, the "second" orientation corresponds to an "opaque" state wherein the respective rotating anisotropic element is oriented to substantially prevent the passage of backlight therethrough from the back plane electrode to the front plane electrode of the display assembly.

In one specific embodiment, the anisotropic elements are at magnetically anisotropic, optically anisotropic, and electrically anisotropic. For example, the anisotropic elements can be partially conductive.

In another embodiment, the front plane electrode and each of the plurality of back plane electrodes are configured to selectively cooperate to generate a magnetic field, in a "first" state, across a corresponding cell. In response, a conductively anisotropic response (a response to magnetic field associated with anisotropy in conductivity in the element) is induced that orients the corresponding rotating element in the first orientation.

In yet another configuration, the front plane electrode and each of the plurality of back plane electrodes are configured to selectively cooperate to generate an electric field, in a "second" state, across each cell. In response, an electrically anisotropic response (a response to electric field associated with anisotropy of electrical properties (e.g., charge) in the element, is induced that orients the corresponding rotating element in the second orientation.

The "first" state corresponds to a "transmissive" state wherein the respective rotating anisotropic element is oriented to permit the passage of backlight therethrough from the back plane electrode to the front plane electrode of the display assembly. With respect to the "second" state, it corresponds to an "opaque" state wherein the respective rotating anisotropic element is oriented to substantially prevent the passage of backlight therethrough from the back plane electrode to the front plane electrode of the display assembly.

In one specific embodiment, the semi-conductive anisotropy (anisotropy in conductivity) and the optical anisotropy correlate to one another. Further, the anisotropic elements are substantially spherical, and are partially (e.g., hemispherically) coated with a hemispherical coating.

In still another embodiment, the rotating anisotropic elements are spherical, and are hemispherically coated with a hemispherical coating. In another arrangement, the hemispherical coating contains conductive particles.

At least perimetrically, the rotating elements each include a substantially transparent hemisphere on one side, and a substantially opaque hemisphere on the opposite side. The transparent hemisphere and the opaque hemisphere intersect along a corresponding edge substantially contained in a respective intersecting plane.

In the first orientation, the intersecting plane of each respective rotational element is oriented substantially perpendicular to the front plane electrode. In the second orientation, the intersecting plane of each respective rotational element is oriented substantially parallel to the front plane electrode.

In yet another configuration, each rotating anisotropic element includes a substantially transparent core that is hemispherically coated with a substantially opaque hemispherical coating. In one embodiment, the transparent core is comprised of borasilica glass.

In another aspect of the present invention, a transmissive display assembly is provided that includes a substantially transparent back plane element having a plurality of electrodes distributed in two dimensions on the backplane. Each electrode allows independent control of a discrete region of the display. A substantially transparent front plane element is disposed substantially parallel and adjacent the back plane element. The front plane element includes at least one electrode disposed opposite the back plane. The front plane element is spaced apart from the back plane element by an interior wall defining a plurality of cells therebetween. A plurality of at least semi-conductive and optically hemispherically anisotropic elements is rotatably disposed in the plurality of cells. A fluid is provided in the cells such that the anisotropic elements can rotate between a first orientation and a second orientation within their respective cells when an electric field applied to the cells.

In an other aspect of the present invention, a method of using the rotating element display assembly is provided including providing a plurality of signals to at least some of the electrodes of the display, and creating a potential difference between the electrodes in response to the signals. The method further includes rotating at least some of the anisotropic elements between the first orientation and the second orientation in response to the potential difference.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawing, in which:

DETAILED DESCRIPTION OF A PREFERRED EMBODIMENT

Figure 1A:
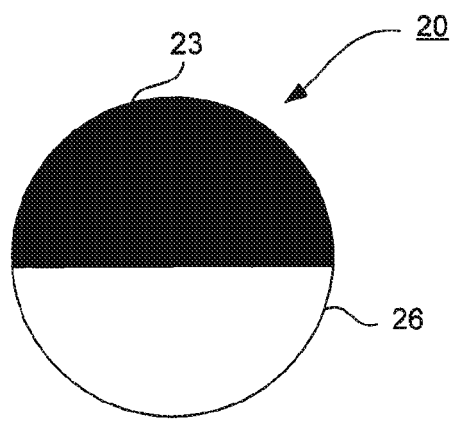
FIG. 1A is a side elevation view of a transparent sphere suitable for a twisting element display having a hemispherical semi-conductive coating constructed in accordance with the present invention.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various Figures.

Introduction and Overview

Transmissive electro-optic displays of present invention may possess a number of advantageous characteristics that may compare favorably to Gyricon electronic paper. These displays may provide high brightness and contrast images (due, for example, to transmissive properties of the transparent rotating spherical elements employed coupled with the backlight nature of transmissive based displays, and the specific properties of the matrix). They also may possess high resolution due to, for example, small pixel size. Further, the displays of present invention may be manufactured from environmentally robust materials, resulting in environmentally stable displays (e.g., displays withstanding high temperature and high humidity conditions). The design of these displays allows for easy display manufacturing, making use, in certain embodiments of a channel in the matrix during display assembly.

The simplicity of electro-optic displays provided by this invention minimizes the number of components, and thus cost of display manufacturing. In some embodiments, the displays of present invention only require backlighting, while displaying information, thus saving on power required to hold the image in place. In other embodiments, the displays could be used as an active sun-shade whereby no power is required during operation.

Since these displays rely on the response of elements, that are suspended in a dielectric fluid, to an electric stimulus to produce an optical effect, they are sometimes referred to as electro-optic displays. Electro-optic displays in which elements rotate to produce optical effects are sometimes referred to as twisting element or rotating element displays. While element movement can be both translational and rotational, it is sometimes advantageous to constrain the movement to rotational movement only (or rotational movement coupled with minimal translational movement). Therefore, in certain embodiments, twisting element displays of this invention employ only rotational movement of the elements. It should be noted, however, that in some embodiments of the present invention, there may exist a translational component to the movement of the elements, in conjunction with the rotational component. Rotating elements of this invention are typically spherical in shape. This allows the use of simple matrix designs for housing the rotating elements. For example, the matrix may comprise an array of generally cylindrical cells to house the rotating elements. It should be understood, however, that in certain embodiments non-spherical rotatable display elements, such as cylinders, may be used, and a matrix with rectangularly-shaped cells may be appropriate.

It is known that electrically anisotropic elements having a non-uniform charge distribution on their surfaces can be caused to move in discrete electric fields. This movement can be coupled with a change in the observed optical properties of the element, so that the viewer will observe different appearance of the element (e.g. black or white) depending on the direction and the strength of the field. More particularly, such response to an electric field causes alignment of these electrically anisotropic elements to substantially a reference 0° position (or to substantially a 180° rotation depending upon the direction of the electric field). One particular embodiment is described in commonly owned application Ser. No. 11/973,883 (the '883 Application), titled "ELECTRO-OPTIC DISPLAY", naming Lipovetskaya and Gobrogge as inventors, filed Oct. 9, 2007, which is herein incorporated by reference in its entirety and for all purposes.

In accordance with the present invention, however, it has been further observed that when these electrically anisotropic elements are also at least semi-conductive on one hemisphere thereof, under appropriate electric field conditions or a change in electric field conditions, a sufficiently strong magnetic field is generated upon which the conductive or semi-conductive hemisphere of the rotating element is responsive thereto. That is, these electrically anisotropic elements that contain a threshold semi-conductive hemisphere responds to both an electric field (aligning with the electric field (depending upon its direction) in either the 0° position or 180° rotation, as will be described) and responds to the rate of change of the electric field, which is effectively a magnetic field response, that generates a magnetic field in a direction substantially orthogonal to the electric field. Thus, in the latter response situation, when the generated magnetic field is sufficiently predominant over the electric field, the conductive or semi-conductive hemisphere of the rotating element aligns in either the 90° rotation or the 270° rotation.

Briefly, for the sake of clarity and the ease of description, the electric field response of the rotating elements will only be described as a 180° rotation, while the magnetic field response of the rotating elements will only be described as a 90° rotation. It will be appreciated, of course, that these rotations depend upon the direction of the electric field, and consequently, the direction of the magnetic field. Thus, an electric field response of a 0° rotation, and a magnetic field response of a 270° rotation are just as easily attainable. Furthermore, the one hemisphere of the rotating elements having conductive or semi-conductive properties will also only be described as having semi-conductive properties for clarity and ease of description as well.

Referring back to the response of the rotational elements to an electric and magnetic field, these element movements can be coupled with a change in the observed optical properties of the element, so that the viewer will observe different appearances of the element, depending on the direction, the strength and the rate of change of the electric field. For instance, referring to FIG. 1A-1C, one specific embodiment of a rotating element, generally designated 20, is as a rotating sphere having a substantially spherical transparent core 22. One hemisphere 23 thereof preferably contains a black or "Opaque" coating 24, while the remaining "transparent" hemisphere 26 remains substantially transmissive. By orienting the hemispherical "Opaque" coating 24 relative to the sphere when aligned in a 180° rotation (i.e., in response to an electric field), a corresponding sphere $20_O$ may have the appearance as "black" due to the opaque nature of the coating, as shown in FIG. 2, and when viewed from the direction of arrows 28 in FIG. 3.

On the other hand, when the rotating sphere when aligned in a 90° rotation (i.e., in response to a magnetic field), a corresponding sphere $20_M$ may have the appearance as being "white" or illuminated (if backlit) due to the transmissive nature of the exposed transparent hemisphere 26. Accordingly, appropriately ordered and contained addressable arrays of such elements can be used to provide a transmissive rotating element display structure 30 that can be backlit, and is also often bistable, thus providing images that are stable in the absence of external electric input.

Figure 2:
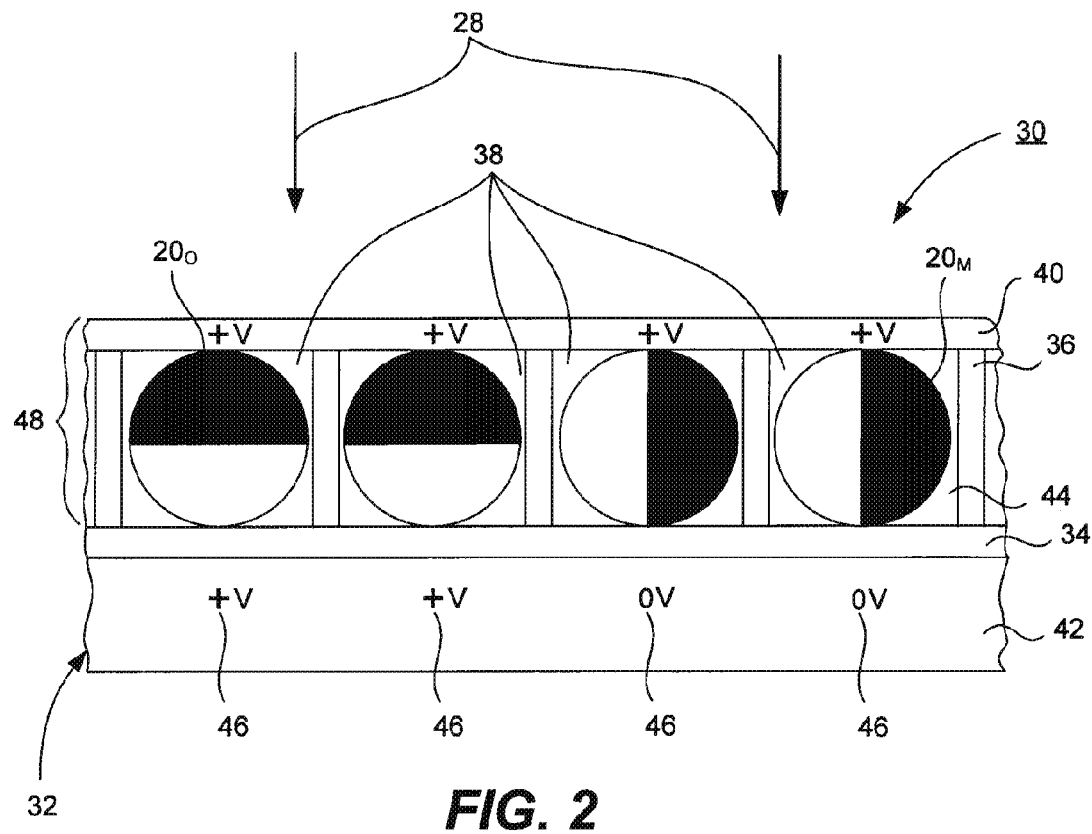
FIG. 2 illustrates a cross-sectional side view of a twisting element display in accordance with one embodiment of the present invention.

Turning now to FIG. 2, a cross-sectional view of a display structure 30, in accordance with one embodiment of the present invention, is illustrated. The viewable direction is indicated by arrows 28. The display structure 30 includes a matrix 32 having a base 34 and matrix walls (or posts) 36 that define a plurality of cells 38. Each cell is formed and dimensioned for rotating receipt of a respective transparent sphere or rotating element 20, each having one semi-conductive hemisphere 23 thereof. A Front Plane Electrode layer 40 (FP Electrode) is disposed on the viewable front side a matrix base 34, while a back plane element 42 is attached to the rear side of matrix base. The spheres are immersed in fluid 44, so that they can freely rotate when an electric field is applied. A plurality of respective Back Plane Electrodes 46 (BP Electrodes, but no details depicted) is distributed in two dimensions on the back plane element 42. Each electrode 46, thus, can independently control a discrete region of the display structure 30, typically a single cell and sphere. Alternatively, one electrode can control multiple spheres. In one example, each sphere and associated backplane electrode together corresponds to one pixel on the display.

The front electrode layer 40 typically contains one or more front Plane Electrodes (FP Electrode) and is usually composed of a conductive transparent material, such as indium/tin oxide (ITO) coated on polyethyleneterephthalate (PET). Other conductive transparent materials suitable for front electrode layer include conductive polymers (e.g. PEDOT (poly (3,4-ethylenedioxythiophene)), or PSS:PEDOT (poly(3,4-ethylenedioxythio-phene) doped with poly (styrenesulfonate)), carbon nanotubes, doped oxide materials, such as aluminum/zinc oxide, and the like. These materials can be used either alone or as coatings on transparent substrates, such as PET. The front electrode layer should, preferably, have very high light transmissivity. For example, transmissivity of greater than about 82%, preferably greater than about 85% is preferred. ITO-PET films with these transmissivity properties are commercially available from a number of suppliers, such as CPFilms Inc. of Fieldale, Va. and Sheldahl Inc. of Northfield, Minn. Typically, the front electrode layer is a single sheet of electrode material covering all or a significant fraction of the pixels (and rotating elements) in the display structure 30. This is in distinction from the backplane electrodes, where each electrode is associated with a single pixel. The potential differential between the front and back electrodes creates the necessary electric field for rotation of the spheres. In some embodiments, however the front electrode layer may include a plurality of electrodes, wherein each electrode may address individual pixels or individual rotating elements of the display structure 30. Note that the assembly 48 is usually referred to as the "front plane" of the device and includes the front electrode layer 40, the matrix, the spheres, and the fluid.

Referring now to the rotating spheres 20, in accordance with the present invention, not only are the spheres optically and electrically anisotropic, similar to those employed in other Gyricon displays, but they are also conductively anisotropic. With respect to electrical anisotropy, in one specific example, the transparent core 22 of the rotating spheres 20 may be electrically anisotropic, while in another embodiment, charged coatings may be applied to render the sphere electrically anisotropic. With respect to conductive anisotropy, the transparent core 22 of the sphere 20 can be substantially non-conductive, but include a semi-conductive coating 24 on one hemisphere 23 thereof, while the remaining hemisphere 26 is transparent, and thus transmissive. More particularly, the semi-conductive coating 24 is opaque, most preferably containing carbon black pigmentation, yielding the highest contrast between a rotating element in the 180° "Opaque" orientation (i.e., spheres $20_O$ in FIGS. 2 and 3) and one in the "Transmissive" orientation (spheres $20_M$). Hence, in this configuration the optical anisotropy and the semi-conductive anisotropy correlate with one another.

In selected embodiments, the core 22 of the rotating spheres 20 may be comprised of two or more optically different segments, as well as having differing conductive properties. For example, one hemisphere 26 may be substantially transparent and non-conductive, while the other hemisphere 23 may be substantially opaque and semi-conductive, the two hemispheres being fused or adhered to form a single sphere unit.

When an appropriate potential difference is applied between the electrodes on the back and front plane elements, the electrically anisotropic sphere in a cell will rotate so as to align with the applied electric field, thereby presenting a black or "Opaque" hemisphere 23 (i.e., spheres $20_O$ in FIGS. 2 and 3) to the viewer. The rotation between the "Opaque" states is preferably by about 180±15° (from a reference 0° orientation), so that a black hemisphere 23 is fully visible. On the other hand, as will be described in greater detail, when an appropriate larger potential difference is applied between the electrodes of the back and front plane elements, and when the rate of change of this electric field surpasses a threshold (i.e., under a threshold period of time), the rotating element in the corresponding cell will rotate so as to align its hemispherical, semi-conductive coating with the predominant magnetic field that is oriented substantially orthogonal to the electric field. The rotation of the element between "Transmissive" states is preferably by about 90±15°, so that one-half of the black hemisphere 23 is fully visible, and one-half of the transmissive hemisphere 26 (i.e., spheres $20_M$ in FIGS. 2 and 3) is fully visible, thereby permitting the light originating from the backlight to pass therethrough, illuminating the cell.

Figure 3:
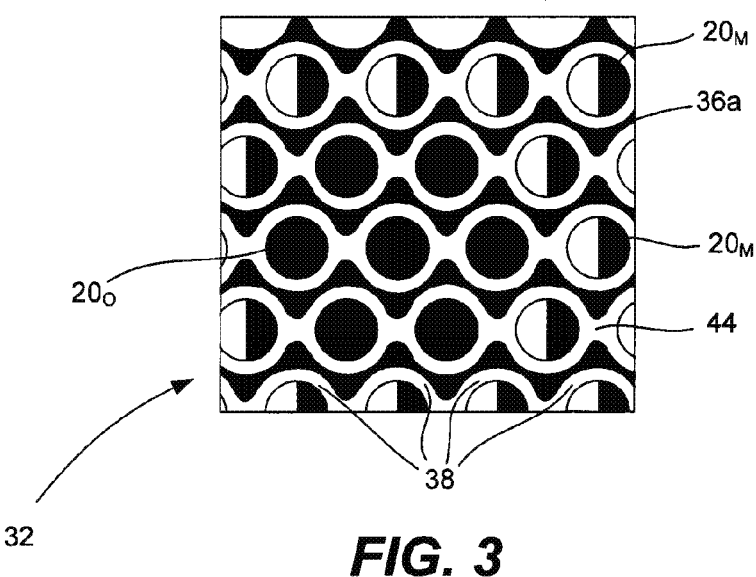
FIG. 3 shows a top plan view of a twisting element display illustrating hexagonally close-packed monolayer of spheres in accordance with one embodiment of the present invention.

Briefly, in one specific embodiment, the interstitial portions of the matrix are substantially black, as generally represented by walls 36a in FIG. 3. Accordingly, as incident light falls onto the display structure 30, from the direction shown by arrows 28, after it passes through the transparent front electrode layer, incident light falling into the interstices between the spheres (or other rotational element) is absorbed, or partially absorbed (depending on the optical properties of the displayed). Similarly, the incident light is also absorbed by the black semi-conductive coating on the transparent core 22 of the spheres (i.e., spheres $20_O$), especially those oriented such that the entire hemisphere is presented to the viewer. Together, the blackened interstitial portions of the matrix and the array of black hemispheres yield a black background.

However, when rotational elements are oriented in the "Transmissive" orientation, light from the backlighting is permitted to pass through the transparent hemisphere portion 26 of rotating element (i.e., spheres $20_M$), and out though the transparent front electrode layer, thereby creating an illuminated image or cell on a black background.

Generation of the Electric Field and the Magnetic Field

As previously mentioned, it has long been known that electrically anisotropic elements having a non-uniform charge distribution on their surfaces can be caused to align and move in discrete electric fields. In the case of these display structures, depending upon the direction each electrode is driven (i.e., the VCOM (ITO) FP electrode 40 and the respective BP Electrode 46 from either 0 to +V or +V to 0), these positive or a negative electric fields are typically directed across a particular cell, in a direction substantially perpendicular to the face of the FP Electrode 40. Further depending upon a number of design considerations, such as for instance, the mass of the spheres, the surface charge distribution of the electrically anisotropic elements and the dielectric fluid employed, a relatively small threshold voltage differential between the opposed electrodes will generate a torque upon the sphere 20 that is sufficient to rotate, align and reorient it from the "Transmissive" 90° orientation (i.e., sphere $20_M$ in FIGS. 2 and 3), toward the 180° "Opaque" orientation (i.e., sphere $20_O$ in FIGS. 2 and 3).

The E-Field across each cell is calculated through the equation:

$$E=(\Delta V_{BPE}-\Delta V_{ITO})/m$$

where $\Delta V_{BPE}$ is the change in the voltage on the BP Electrode 46, and $\Delta V_{ITO}$ is the change in the voltage on the common VCOM (ITO) FP Electrode 40 from one Frame to the next Frame. Thus, for a potential differential between the electrodes of about 15-20 volts, generated over a 75-100 micrometers separation distance (a typical back and front electrode separation distance), a relatively small electric field of about 0.2V per micrometer is generated (e.g., this invention) but should not occur at significantly lower voltages such as those encountered to charge lines in the backplane. Thus, for example, display transitions for a 180° rotation may be designed to occur at fields attained at 15-20 volts over 75 micrometers.

It has been observed, however, that when a relatively large change in the Electric Field (e.g., at least a $\Delta E$ of ±2E) across the (ITO) FP electrode 40 and the respective BP Electrode 46 occurs in a relatively rapid time period (e.g., a $\Delta t$ generally less than about 5 milliseconds), a magnetic force MF is generated in a direction substantially orthogonal to the direction of the Electric Field. In general, the Magnet Field (MF) across each cell is proportional to the equation:

$$MF=\Delta E/\Delta t.$$

It is also known that vibrating spheres, containing encased magnetic particles, can be caused to align in particular patterns when subjected to an external magnetic field Justin Stambaugh et al., *Pattern Formation in a Monolayer of Magnetic Spheres*, PhysRevE.68 026207 (2003). Analogously, liquid suspended rotating spheres, having a semi-conductive hemisphere have been observed to align with the magnetic field, when the magnetic field is sufficiently large. That is, when the effect of the magnetic field on the hemispheres semi-conductivity becomes sufficiently strong to predominate the effect of the electric fields effect upon the anisotropically charged sphere. In other words, when the rate of change of the electric field ($\Delta E//\Delta t$) is sufficiently large, these semi-conductive, hemispherically coated spheres respond to the orthogonal magnetic field rather than the electric field.

As noted above, this threshold has been observed to occur when the opposed electrodes of a pixel are subjected to a relatively large $\Delta E$ (e.g., ±2E) in a relatively small $\Delta t$ of less than about 5 milliseconds. Thus, using the example above, for a relatively large $\Delta E$ (e.g., ±2E) of 0.4V/µm change between the electrodes in less than about 5 milliseconds generates a small, orthogonal magnetic field.

More particularly, these movements can be coupled with a change in the observed optical properties of the element, so a corresponding rotating element 20 of a pixel oriented in the "Opaque" orientation (i.e., sphere $20_O$ in FIGS. 2 and 3) will be caused to reorient in the "Transmissive" orientation (i.e., sphere $20_M$ in FIGS. 2 and 3). In accordance with the present invention, therefore, not only can the electrical response of the sphere be controlled, via electrical anisotropy, but the magnetic response of the sphere can be controlled as well, via conductive anisotropy.

Hemispherical Semi-Conductive Rotating Elements

Due to the transmissive application of these rotating elements, at least one hemisphere thereof, and preferably the entire sphere, should be substantially transparent. Substantially transparent elements suitable for use in the twisting element or rotating element display may have a variety of shapes and structures. Although the rotational elements have primarily been shown and disclosed as spheres, other shaped rotatable elements may be suitable for use with this invention, including cylinders, ellipses, ovals, football-shaped elements, and the like. Structural aspects of these elements will be illustrated with the reference to transparent spheres, but it should be understood that the same structural considerations can be applied to other shapes as well.

A substantially transparent sphere used in this invention can have a hollow or solid core 22, and be coated with one or more coatings, so that the coating or coatings provide optical, electrical and/or at least semi-conductive anisotropy to the sphere, as will be described. A variety of coating methods known to those of skill in the art can be used. In some embodiments hemispherically coated elements can be manufactured by the transfer coating methods described in commonly owned application Ser. No. 60/876,767, titled "Hemispherical Coating Method for Micro-elements", naming Lipovetskaya et al. as inventors filed Dec. 22, 2006, which is herein incorporated by reference in its entirety.

Figure 1C:
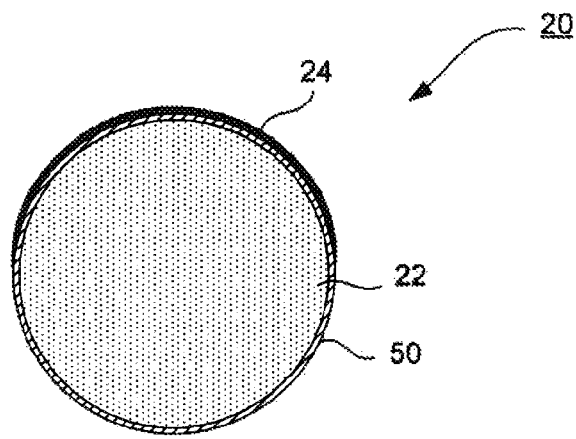
FIG. 1C is a cross-sectional view of another embodiment of the sphere presented in FIG. 1A.
Figure 1B:
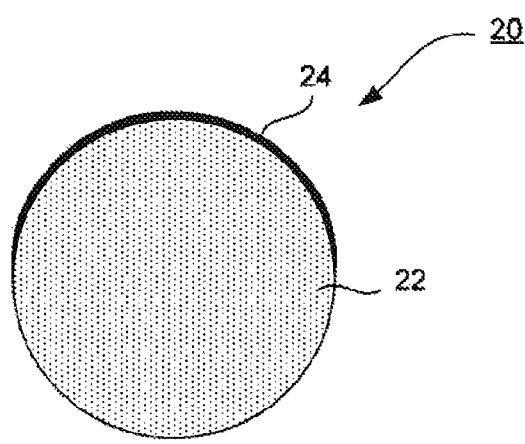
FIG. 1B is a cross-sectional view of one embodiment of the sphere presented in FIG. 1A.

In the present invention, as best illustrated in FIGS. 1A-1C, at least one hemisphere 26 of the spherical core 22 must be substantially transparent in order to permit the transmission of backlight therethrough when the sphere is oriented in a transmissive state (i.e., sphere $20_M$ in FIGS. 2 and 3). In general, however, the entire core will be substantially transparent, or at least partially transparent. In this instance, the transparent core 22 of the sphere 20 can be hemispherically coated (or approximately hemispherically coated) with a coating 24 differing from the core sphere optically, electrically and conductively. For example, a transparent essentially neutral sphere can be hemispherically coated by semi-conductive carbon black pigment carrying negative charge.

In another example, the substantially transparent spherical core 22 can be hemispherically coated with two coatings having different combinations of optical, electrical and/or semi-conductive properties. For instance, a transparent coating 50 providing a negative charge can be employed on one hemisphere 26 (or over the entire core 22), while a black opaque coating 24 providing a positive charge and semi-conductivity can be employed on the other hemisphere. The spherical transparent core 22 itself may be neutral, charged or anisotropically charged as well. In the last case, as mentioned, only an opaque, semi-conductive coating need be applied to one hemisphere 23.

In an alternative embodiment, no core sphere is employed, and instead two hemispheres with different properties can be fused together or otherwise combined to form an optically, conductively and electrically anisotropic sphere. For instance, a solid substantially transparent hemisphere and a semi-conductive black hemisphere, carrying opposite charges, can be fused or adhered together.

Examples of elements that can be used in the display structure 30 are illustrated in FIGS. 1A-1C. FIG. 1A shows a side view of sphere 20 having a transparent hemisphere 26 and a semi-conductive black (opaque) hemisphere 23. Referring now to the sectional view of FIG. 1B, one sphere embodiment is depicted having a black semi-conductive coating 24. In contrast, FIG. 1C also provides solid transparent core sphere 20 that is completely coated with a substantially transparent "charged" coating 50 (e.g., positively charged or negatively charged), and also with a black semi-conductive hemispherical coating 24 that is also "charged" on top of the transparent coating. Consequently, a rotating sphere is provided that is optically, electrically and conductively anisotropic.

While an advantageous property of the present invention resides in the ability to provide high-contrast images, it can also be used in applications in which high contrast is not needed. For example, lighter shade color combinations can be used between the color of the matrix and the opaque coated hemisphere 23 of the rotating element 20, and the backlit transmissive hemisphere 26 thereof.

Aside from one hemisphere being transmissive and the other hemisphere being opaque, the spheres can possess other types of optical anisotropy. For example, hemispheres with different levels of transmissivity and reflectance can be applied. In some embodiments one hemisphere has a high specular reflectance, while the other is transmissive.

The spheres should be relatively small in order to provide good display resolution. Appropriate sizes include spheres with diameter ranges of about 25-150 μm, preferably 35-100 μm, for example about 50 μm. Obviously there may be some variance in the sizes of the spheres in a given display. This can be controlled by appropriate sizing techniques such as sieving. In certain embodiments, the matrix has a cell size of 50 μm, while the spheres have a nominal diameter of about 47 μm with a usable range between 45 μm and 49 μm, with a standard deviation of about 1 μm. For optimal optical performance, the sphericity of rotating spheres should be high (e.g., at least about 95%), and the size distribution in the population of spheres should be small. For example a population of coated spheres that range from about 45 to 49 μm in diameter can be used in an individual display. The hemispherical coating layer can be about 1-2 μm thick, and should not significantly distort sphericity of the elements. In certain embodiments, the surface roughness of this coating does not exceed about 0.5 μm. Alternate sizing combinations can also be implemented. For example a matrix with a cell size of 58 μm could utilize spheres with a nominal size of 55 μm, and a range of 53 to 57 μm.

It should be realized, that much larger elements may be used in certain embodiments. For example, for billboard signs that are typically viewable from the distance of several hundred feet, rotating elements having a diameter of 1-2 inches may be appropriate. In general, elements of any size, that would produce a good display resolution for a particular application of the display, will be suitable The materials used for the spherical core 22 and for the coatings should preferably have a melting point or glass transition point of higher than 100° C. in order to withstand high-temperature operations during the manufacturing process and exposure to high temperature during end use. The coating materials should also be compatible with the fluid in which the spheres will be suspended for rotation, e.g., they should not dissolve or swell in this fluid. Further, it may be desirable to employ elements having a density that is similar to that of the dielectric fluid. In certain embodiments, the spheres, or at least the core sphere is made from a material such as borasilica glass, ceramic, or other clear or transparent polymers. The spheres, although they can be made from intrinsically brittle materials, should have good crushability characteristics. For example, they may be able to withstand compressing liquid pressure in the range of 350-3000 psi, as used in the standard industry crushability test.

The rotation of the spheres by 90° or by 180° should occur within a defined window of magnetic field and electric field, respectively. These transitions should occur easily at fields generated by actuation of backplane control circuits. In one specific example, erasing or initializing the display image to all "opaque" (e.g., black) image involves applying ±20 V to all of the back plane electrodes with reference to ITO electrode layer. As set forth above, an electric field of about 0.2 V per micrometer is generated that is sufficient to cause the 180° rotation. Along the same lines, applying a change in the electric field ΔE in the range of about ±0.4V/um in less than about 5 milliseconds yield a magnetic field sufficient to reorient the semi-conductive rotating sphere from the 180° "Opaque" orientation (i.e., sphere $20_O$ in FIGS. 2 and 3) to the 90° "Transmissive" orientation (sphere $20_M$).

In this example, the total voltage drop across any pixel is never greater than 20V, but the bus carrying voltage must be able to handle the range of ±20 V to +20V. The ±20 V window is a suitable potential for organic semiconductor/conductor backplanes.

When using other types of backplanes, such as inorganic TFTs, for example, higher voltages (e.g., ±40 V) may be employed. For segmented circuit board back planes, one could use even higher voltages. It is expected that such voltages will generate a torque force sufficient to rotate the sphere. However, design considerations require that the spheres have a mass and surface charge distribution appropriate to accomplish this. It is, therefore, important to provide spheres made from materials with appropriate densities, so that they could be rotated in the designed voltage range. Depending upon the dielectric fluid employed and other design criteria, the spheres may have a density of between about 0.4 and 6 g/cm³, preferably between about 0.4 and 1.3 g/cm³. Most preferably, the spherical cores 22 are solid, and composed of a substantially transparent material, such as solid borasilica glass, transparent or at least transmissive ceramics or polymeric spheres with densities ranging from about 1 to 6 g/cm³ can also be used. In certain embodiments, it may be advantageous to use hollow spheres, which may be made of glass, ceramic, or high-temperature resistant polymeric materials. Such spheres may have densities ranging from 0.03-2.5 g/cm³.

The spherical core 22 of the rotating elements 20 with such characteristics can be obtained from various commercial suppliers. In some cases, these spheres are marketed for surface processing applications. It may be necessary to sieve commercially obtained spheres in order to ensure a tight size distribution suitable for electrophoretic displays. For example, solid borasilica glass spheres can be obtained from Mo-Sci Corporation, North Rollo Mo. In addition, hollow glass spheres can be obtained from Potters Industries, Berwyn, Pa. Ceramic spheres can be obtained from Saint-Gobain Coating Solutions, Northampton, Mass., and plastic spheres can be obtained from Asia Pacific Microspheres SDN BHD, Selangor Darul Ehsan, Malaysia & Grinding Media Depot, Wyncote, Pa.

Figure 4:
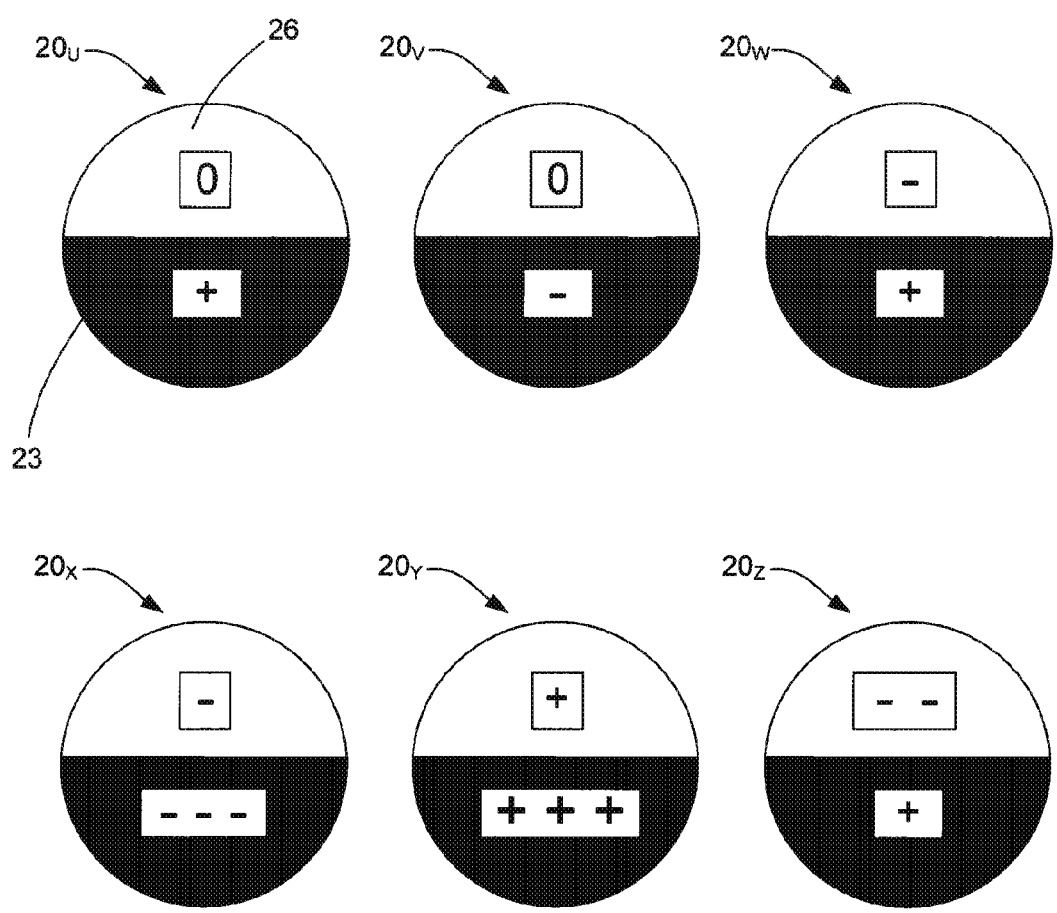
FIG. 4 presents selected examples of charge distributions suitable for providing electrical anisotropy to the spheres.

The spheres should be electrically anisotropic, in order to be sensitive to the electric field. Electric anisotropy does not necessarily imply that the two hemispheres are oppositely charged. It is sufficient that there is some non-uniformity in the charge distribution about the surface of the sphere and that this non-uniformity correlates with optical anisotropy. A variety of different charge distributions are possible. Some of the examples are shown in FIG. 4. As illustrated by spheres $20_U$ and $20_V$, one hemisphere can be neutral, while the other can be positively or negatively charged. In sphere $20_W$, the hemispheres have opposite charges of equal magnitude. It is also possible to have oppositely charged hemispheres with one charge being greater than the other as illustrated by sphere $20_X$. In sphere $20_Y$ both hemispheres are negatively charged and higher charge density exists on a black hemisphere. In another example, depicted by sphere 20, both hemispheres are positively charged, with higher charge density residing on a black hemisphere. In general, spheres having any non-uniformity in charge distribution about their surface, e.g. a dipole moment, can be used.

In one embodiment, significant quantity of charge is provided to the sphere via the coatings, particularly by the hemispherical coating, while the core sphere is neutral or possesses a small amount of charge. The hemispherical coating should preferably provide a permanent electric charge. The necessary charge may be provided, for example, by the pigment or the binder of the coating or by special charge enhancing additives. Examples of these additives include quaternary ammonium compounds, organic sulfates and sulfonates and other compounds known to those of skill in the art, such as those listed in U.S. Pat. No. 6,379,856, which is incorporated herein by reference in its entirety. The necessary charge may also be provided by special processing techniques of coating preparation and application. These techniques impart charge by, e.g., applying friction to the coating material as it is dispensed.

In accordance with the present invention, the spheres are also be conductively anisotropic, in order to be responsive to the generated magnetic field. As indicated, at least one hemisphere of the sphere should exhibit semi-conductive or conductive properties. In one embodiment, the semi-conductivity is provided to the sphere via the hemispherical coating, while the core sphere is neutral or substantially non-conductive. The hemispherical coating is preferably permanently conductive, which may be provided, for example, by the pigment or the binder of the coating or by special conductive enhancing additives. Examples of these additives include metallic or conductive particles, such as carbon black pigment particles.

In one specific embodiment, the hemispheric coating is provided by a carbon black "opaque" coating containing suspended carbon particles. Carbon black has long been known to provide very nice "black" characteristics for reflective displays. As the carbon black pigment particles get smaller in size, on the nanometer range, the absorbance characteristics improve, creating a better black. On the other hand, as the size of the particles decrease (i.e., approximately less than about 50 nm), the density of these conductive carbon black pigment particles increase to a point where a path is created for an electron charge can jump from particle to particle (i.e., semi-conductive) in the coating. These conductive pigment particles, thus, not only provide the requisite semi-conductivity but also the requisite "opaque" pigmentation to substantially prevent any transmissivity through those coated portions of the transparent sphere (i.e., providing a nice dark "black"). In other words, spherically, the non-uniformity in the conductivity about the surface of the hemisphere correlates with the optical anisotropy.

In general, the torque response of the sphere to the magnetic field is a function of the sphere mass and the conductivity. An accurate measure of the minimum threshold level of semi-conductivity required to be rotatably responsive to the magnetic field, however, is difficult to quantify. In fact, not only is the density of the conductive carbon black pigment particles a function of the coatings conductivity, but so is the dispersion thereof. That is, any process which improves the dispersion of the conductive particles will also increase the conductivity of the epoxy, and thus induce the 90 degree rotational effect. This can be as simple as varying the mixing time using a high shear mixer using a Ball Milling process. Generally, of course, the greater the percentage of the carbon black pigment, by weight, the more conductive the coating becomes regardless. Moreover, the greater the pigment density, the deeper the black color. Hence, in this instance, the black carbon the pigment itself provides the right combination of color opacity and conductivity so that when the concentration, density and/or particle size, the conductivity of the coating can be increased or decreased.

With respect to the pigment particle density, it has be observed that at least about 5% carbon black pigment particles, by weight, is required to enable a sufficient degree of semi-conductivity in the coating to enable the rotational elements to react to the change in the electric field (i.e., the magnetic field). On the other end, when the density of the carbon black pigment particles is greater than about 80%, by weight, the coating becomes so conductive that the sphere becomes too responsive to the magnetic field, and, thereby, too insensitive and/or non-responsive the electric field. That is, the increased sensitivity and responsiveness of the nearly conductive coating to the magnetic field will nearly always predominate the sensitivity and responsiveness to the electric field by the electrical anisotropic surface. In these instances, a sphere that is already oriented in the 90° "Transmissive" orientation (sphere $20_M$) may have difficulty reorienting back to the 180° "Opaque" orientation (i.e., sphere $20_O$ in FIGS. 2 and 3) due to the sphere's increased responsiveness to even smaller electric field changes between the electrodes (i.e., relatively small magnetic fields).

With respect to the pigment particle dispersion, it has further been observed, as mentioned, that the dispersion of the epoxies in the coating can also significantly affect the coating conductivity. A uniform dispersion of the conductive particles over the coated hemisphere, for example, provides better overall conductivity than when the conductive particles are conglomerated or in chunks of unevenly dispersed carbon black particles. The latter situation tends to create conductive hotspots, impeding the coating ability to properly respond to the magnetic filed.

Besides the particle size, the dispersion of the carbon black pigment particles can be regulated by the viscosity of the carbon black formula, the mixing process, all of which further contribute to the resulting conductivity of the resultant coating. Generally, the less viscous the coating formula, the more evenly and uniform the dispersion of the particles when the coating is applied. However, due to the thinner, less viscous, coating, the greater the concentration of the carbon black pigment particles necessary to provide the requisite conductivity. In contrast, the greater the viscosity, the less evenly and less uniform the dispersion, but also the lower the concentration of the black carbon pigment particles need be.

Common carbon black formula/materials for creating the desired effect and response include American Coding Materials Inc (ACMI) ink numbers: Black 6605, Black 6100, Black 6608, Black 6600 and Red 6100, to name a few, with the formula 6600 being very viscous, and the formula 6100 being less viscous. These formula's are also mixed with Formulated Epoxies which include, for instance, Clear or Yellow 6100 ACMI with either >5% Carbon Black (i.e. Cabot Mogul L) or >20% F6331-2 Geode Ferro Coal Black.

The hemispherical coating to be applied is relatively thin in comparison to the dimensions of the sphere (e.g., about 1-2 μm thickness). The coating should provide optical and surface properties as presented above (e.g., reflectivity, opacity, color, and roughness). In certain embodiments, the coating is made from a binder and a pigment. In some embodiments, a solvent may be added for manufacturing. In some embodiments, a special charge-imparting agent may be added.

The spheres are electrically anisotropic when immersed into the fluid for rotation. While it is advantageous that they possess a permanent electrical and conductive anisotropy, in some embodiments both forms of anisotropy may be induced or enhanced when they are immersed into the fluid, either by the fluid itself or by other means.

The fluid should have appropriate characteristics that will allow sufficient rotation (e.g., complete 180 degree) of the sphere in the preferred driving potential range. Dielectric fluids, essentially non-conductive transparent fluids, such as silicon oils, mineral oils and isoparafins are suitable. The fluid should preferably have a conductivity of less than 1000 femtomho/cm (femtosiemens/cm), preferably between about 20 and 200 femtomho/cm. In certain embodiments, the fluid will have a low dielectric constant (e.g., less than about 2.5 (preferably less than about 2)) and a viscosity of between about 0.5 and 5 centistokes. These characteristics are selected so that a threshold voltage, response time, and operating voltage window of the device are optimized. Examples of suitable dielectric fluids include silicone fluids, such DC200 available from Dow Corning of Midland, Mich., isoparafins, such as ISOPAR, available from Exxon Mobile of Irving, Tex., and fluorinated fluids manufactured by 3M.

Throughout this document, hemispherical optical, conductive and electrical properties are discussed. This does not imply that the optical, conductive or electrical properties are limited to exactly hemispherical dimensions. In certain embodiments, the elements may be designed to have one optical material occupy less than a full hemisphere of the element's surface and another optical material occupy more than a full hemisphere. In some embodiments, it may be advantageous to have more than two optically different portions within one sphere Further, even if the desired result is hemispherical, it should be noted that suitable displays may be produced, in certain embodiments, using populations of rotating elements that have significant variance in the geometric extent of the optical or electrical properties. For example, it may be suitable to use a population of rotating elements having optical coatings that vary on average by 10% or even 20% from a perfectly hemispherical covering. Other applications may not tolerate such wide variance.

Matrix Design

As indicated, display structures 30 of this invention may employ a matrix or other structure for confining rotating elements. The structure of a typical matrix 32 allows containment of equally spaced rotating elements 20 in an ordered array of cells 38 or cavities. In one embodiment, as shown in FIG. 2, the cells are arranged in a hexagonal geometry (e.g., a hexagonal close pack pattern) with minimal distance between the centers of adjacent cells. Other embodiments of the matrix structure, such as those providing square, rectangular or rhomboidal arrays for packing of the spheres, can be used. In general, the matrix can provide a containment structure of any desired geometry for the spheres as well as for the elements of other shapes (e.g., cylinders, football-shaped elements and the like). Such applicable matrix designs are described in detail in commonly owned the '883 patent application above mentioned.

Figure 5A:
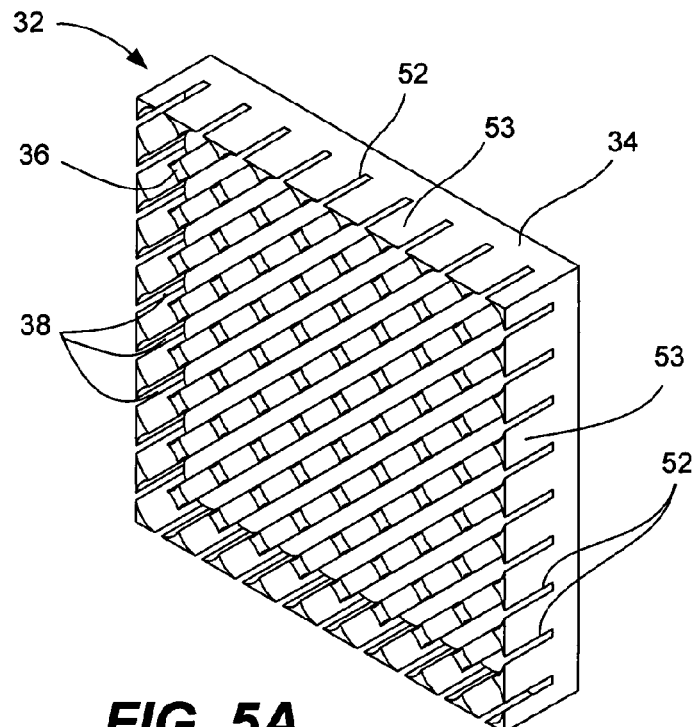
FIG. 5A shows an isometric view of a matrix structure illustrating a square close pack of matrix cells with parallel and perpendicular channels in accordance with an embodiment of the invention.
Figure 5B:
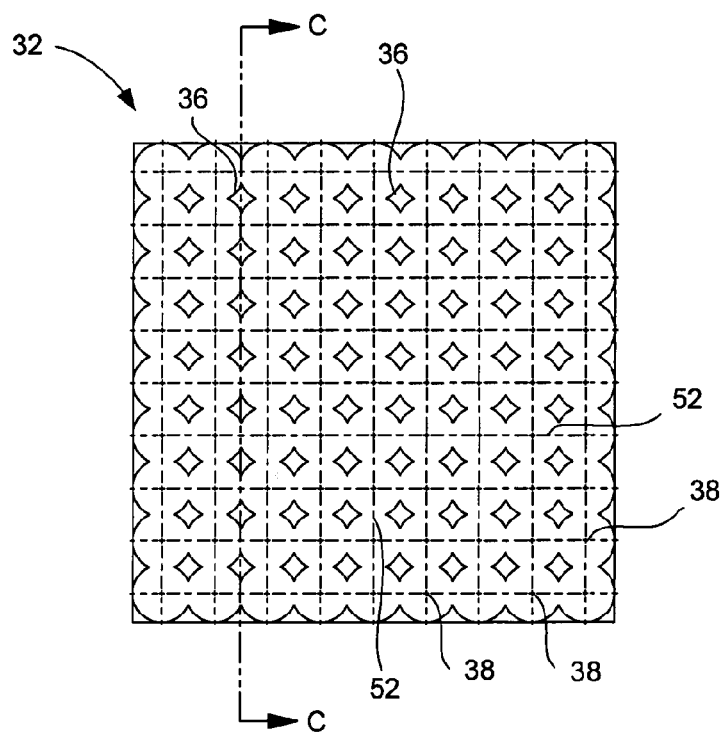
FIG. 5B shows a top plan view of the matrix structure presented in FIG. 5A.
Figure 5C:
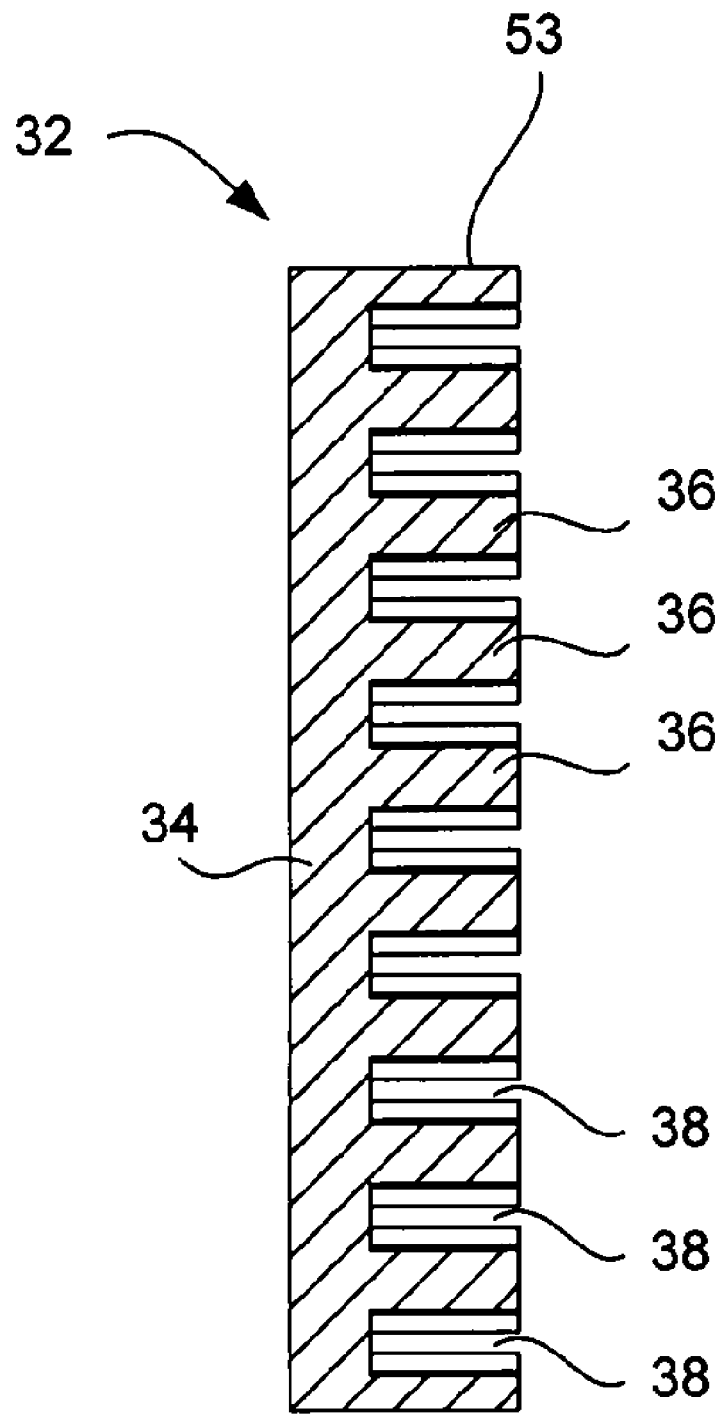
FIG. 5C shows a cross-sectional side view of the matrix taken along the plane of the line C-C in FIG. 5B.

In the embodiment depicted in FIG. 2, the cells are defined in part by serpentine walls 36a offset from one another to allow a hexagonal packing arrangement. In other embodiments, other wall designs (e.g., straight or relatively uncurved shapes) or even pillars (posts) may be employed. In another specific matrix configuration, as illustrated in FIGS. 5A-5C, the cells are arranged in a square close pack and with a number of parallel intercell channels 52. Advantageously, such matrix can employ relatively low aspect ratio posts serving as its cell walls and defining the arrangement of spheres in the matrix. FIG. 5A provides an isometric view of a matrix structure in accordance with this embodiment. FIG. 5B provides a top view and FIG. 5C provides a cross-sectional view of this structure respectively.

The display structure matrix 32 includes the matrix base 34 and matrix end walls 53. A series of parallel channels, including a channel 52, run through the matrix walls (or posts 36), and provide fluid communication between the cells 38. It can be seen that in the embodiment presented in FIGS. 5A-5C the matrix includes a number of posts 36 defining the square close pack arrangement of the cells. Each cell 38 is in fluid communication with all of its adjacent cells through intersecting channels 52.

The cells have an essentially cylindrical geometry, with a diameter of the cell being only slightly greater than the diameter of the sphere. The depth of the cells is defined by the height of cell walls and in this embodiment does not substantially exceed the diameter of the spheres. In alternative embodiments, higher walls may be employed, and the matrix design may allow for a translational movement of the spheres within the cells.

Generally, it is advantageous to closely match dimensions of the holding cell to the dimensions of the element that is disposed within it. The internal cell dimensions (typically height and width or height and diameter) should be selected preferably so that the element does not rotate until a certain threshold voltage is applied to the display electrodes. Together with the carefully selected viscosity of the dielectric fluid, the matched dimensions of the cell and the element are important factors for providing a desired voltage window and display bistability. Further, in those embodiments, where purely rotational movement is desired, the cell dimensions should be chosen to not allow substantial translation of the element within the cell.

As with all of the materials of the display, the matrix material should be heat-resistant, having a melting point or glass transition point of at least 100° C. Further, its optical properties should not be substantially affected by temperature in the preferred temperature range. The matrix material should also be essentially non-conductive. Those portions of matrix material that come into contact with the dielectric fluid should be resistant to it, so that the properties of both the matrix and the fluid are not substantially altered during their long-term contact. Generally, the matrix material should be reasonably flexible to afford easy manufacturing and allow rugged treatment during end use. The matrix should also have a hardness that allows it to withstand normal use but should not be too brittle to impact manufacturability. In certain embodiments, the material will have a durometer of between about 40 shore A and 75 shore D. A variety of materials with these characteristics can be used for matrix fabrication. For example, the matrix can be fabricated from materials used in hot embossing fabrication techniques. Examples of these materials include heat resistant acrylic polymers (e.g. polymethylmethacrylate (PMMA)), polyethylene terephthalate (PET), poly(ether ether ketone)s (PEEK), acrylonitrile butadiene styrene (ABS), polystyrene, polypropylene, polyetherimide (PEI), cyclo-olefin polymers (e.g. a cyclo-olefin polymer sold under the trademark ZEONOR® available from Zeon Chemicals of Louisville, Ky.), or Ultem available from GE Plastics of Pittsfield, Mass., and UV-curable epoxy. In one embodiment, polycarbonate (PC) is a preferred material. As indicated, such materials may include or be coated with a white pigment, such as $TiO_2$.

Method of Use

The rotating element display structure 30 is suitable for displaying both still and moving images. The images are created by providing signals to display electrodes (e.g., back plane electrodes) in the addressable electrode matrix. The signals can selectively address specific electrodes, wherein each electrode allows independent control of a discrete region of the display. For example, each electrode can control one or multiple rotating elements. A potential difference between the front and back electrodes is created in response to the signal, causing the addressed rotating elements to flip and change the pixel color presented to the viewer.

The signals can control the magnitude and polarity of the voltage applied to individual electrodes, as well as the duration of electrical pulses. Therefore, the signals can addressably control the response of individual elements or groups of elements on the display. For example, the signal can determine whether the addressed element should rotate or not, and if it should rotate, the degree of rotation may be also controlled by the provided signal, utilizing pulse width modulation (PWM). Still and moving images can be thus created on the rotating element display. In one embodiment, the inventive display possesses bistability. In this embodiment, still images can be maintained on the display without change in the absence of electrical input from electrodes or other signals.

Figure 6:
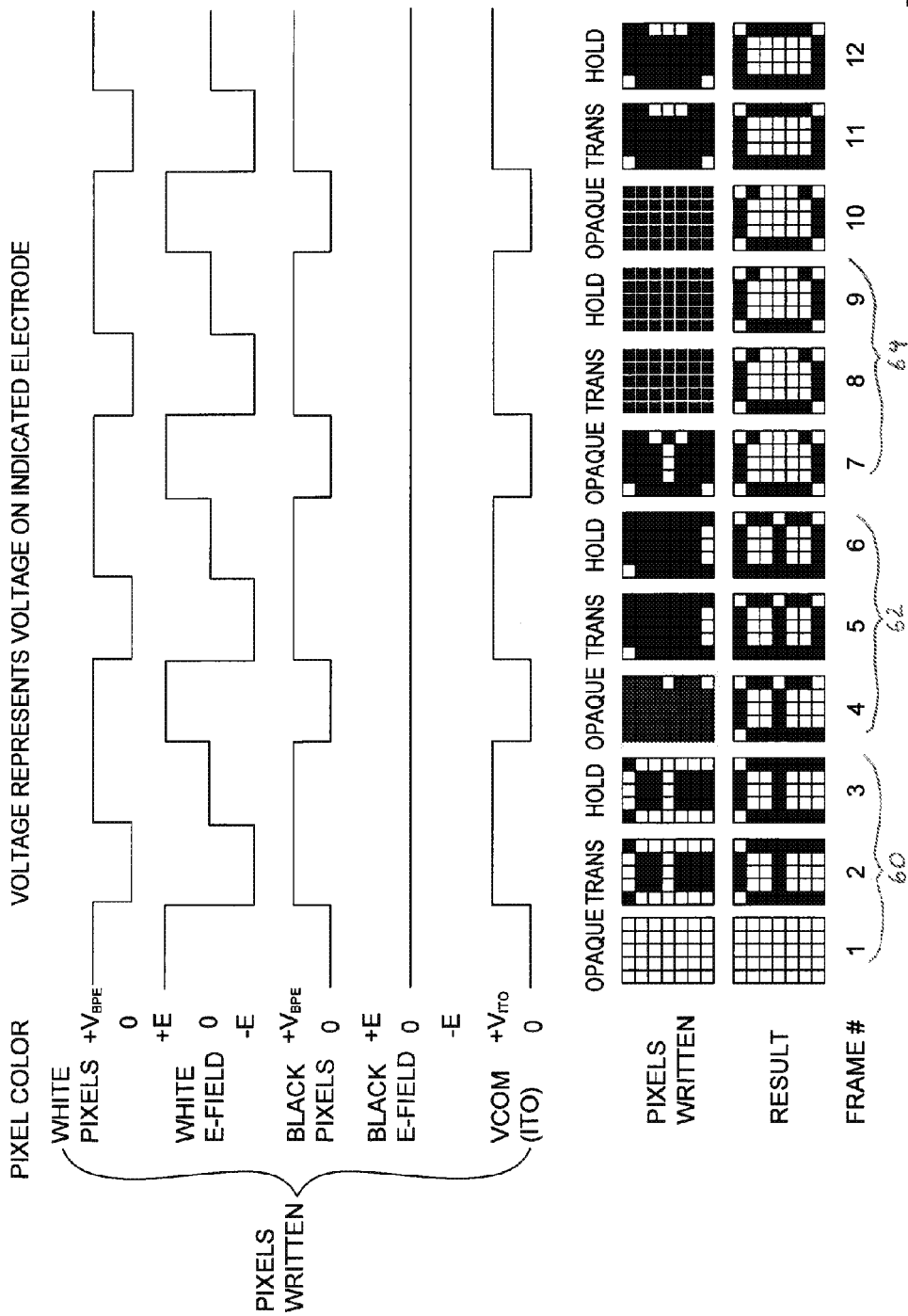
FIG. 6 shows a timing diagram between the voltages of the Front Plane Electrode and the Back Plane Electrode, as well as a schematic diagram of a pixel display assembly representing the corresponding changes.

Referring now to FIG. 6, a timing diagram is shown that illustrates the exemplary steps or cycle necessary to manipulate the individual pixels 54 in an array of pixels (in this example, only a thirty-five pixel array) between the "Opaque" state and the "Transmissive" state. Collectively, the array of pixels form an image such as the letters "A"-"D" shown in the "RESULTS" Row of Frames #1-#12.

As mentioned above, the two electrodes for each pixel consist of the common large Front Plane Electrode 40 (i.e., the FP VCOM (ITO)) and a respective Back Plane Electrode 46 (BP Electrode) on the back side of each pixel. In this specific embodiment, the two opposed electrodes 40 and 46 are essentially only switched between two stages, a low state of about 0 volts and a high state of +V. Briefly, as will be described in greater detail below, the operative voltage range is between about 5V-90V, and more preferably between about 5V-50V, and most preferably between about 5V-25.

The voltage timing diagram for the "WHITE PIXELS" correspond to the BP Electrodes 46 for each "white" pixel $54_{CS}$ shown in the "PIXELS WRITTEN" Row, below the timing diagrams. These "white" pixels $54_{CS}$, in turn, correspond to those pixels whose rotating element 20 (of FIG. 1) has changed state, either from the "Opaque" state (i.e., 0° or 180°) to the "Transmissive" state (i.e., 90°) or from the "Transmissive" state to the "Opaque" state. In contrast, the voltage timing diagram for the "BLACK PIXELS" correspond to the BP Electrodes 46 for each "black" pixel $54_{CS}$ in the "PIXELS WRITTEN" Row. These "black" pixels $54_{NC}$, in turn, correspond to those pixels whose rotating element 20 has not changed state, thus, maintained in either the previous "Opaque" state or "Transmissive" state.

Depending upon the direction each electrode is driven (i.e., the front VCOM (ITO) electrode and the respective BP Electrode from either 0 to +V or +V to 0), a positive or a negative Electric Field (E-Field) is generated across the particular pixel. For example, the E-Field across each pixel is calculated through the equation:

$$E = \Delta V_{BPE} - \Delta V_{ITO}$$

where $\Delta V_{BPE}$ is the change in the voltage on the BP Electrode from one Frame to the next Frame, $\Delta V_{ITO}$ is the change in the voltage on the common VCOM (ITO) electrode from one Frame to the next Frame. Hence, as shown at Frame #1 of the timing diagram, and as will be described in greater detail, a "White" pixel BP Electrode 46 driven to from 0 to $+\Delta V_{+BPE}$ volts and a FP ITO electrode 40 maintained at 0 volts will generate a positive White E-Field across the "WHITE PIXELS" of +1E. In contrast, referring now to Frame #2, a "White" pixel BP Electrode 46 driven from $+V_{BPE}$ back to 0 volts and a FP ITO electrode 40 driven from 0 volts to $+V_{ITO}$ volts will yield a negative White E-Field across the "WHITE PIXELS" of −2E.

As previously mentioned, when a smaller ΔE-Field change (e.g., from 0 to +E, or 0 to −E for that matter) from one Frame to the next Frame varies over a relatively slower Δt (e.g., generally more than about 5 milliseconds), the electric force is the predominant force acting upon the pixel rotating element 20 with the conductive coating on one hemisphere 23 thereof. Since the electric force is generally directed substantially parallel to the planes of the electrodes, a rotating element 20 of a pixel oriented in a "Transmissive" state (i.e., 90°) will be caused to reorient in an "Opaque" state (i.e., 0° or 180°) in the "Opaque" Frames (i.e., #1, #4 and #7).

In contrast, again as previously mentioned, it has been found that when a larger ΔE-Field change (e.g., at least about ±2E) from one Frame to the next Frame varies over a relatively rapid Δt (e.g., generally less than about 5 milliseconds), the magnetic force (proportional to the equation ΔE/Δt) generated predominates the electric force. Since the magnetic force is generally directed substantially orthogonal to the direction of the electric force, a rotating element 20 of a pixel oriented in an "Opaque" state (i.e., 0° or 180°) will be caused to reorient in a "Transmissive" state (i.e., 90°) in the "Transmissive" Frames (i.e., #2, #5 and #8).

As set forth above, the "White" pixels $54_{CS}$ in the "PIXELS WRITTEN" Row in FIG. 6 represent those preselected pixels that alter or Change State (CS) (i.e., either from opaque to transmissive or from transmissive to opaque). The "Black" pixels $54_{NC}$, on the other hand, represent those preselected pixels in which there is No Change of State (NC). The "RESULT" Row, in contrast, represents how the pixels of the array will visually appear to the user, as viewed from the front or viewable side of the VCOM (ITO) electrode 40. The white colored pixels $56_O$ in the "RESULT" row represent the "opaque" pixels (i.e., those pixels with the rotating elements in a 0° or 180°) state, such as spheres $20_O$ in FIGS. 2 and 3), while the black colored pixels $56_T$ represent the "transmissive" pixels (i.e., those pixels with the rotating elements in a 90° state, such as spheres $20_M$ in FIGS. 2 and 3).

To change the pixel array from one discrete image to another discrete image, a three Frame "image" cycle is performed for each pixel simultaneously, whether the respective pixel is maintained in its current stable state (i.e., either opaque or transmissive), or whether the pixel is changed from its current state (i.e., from opaque to transmissive or from transmissive to opaque). For instance, as best illustrated in FIG. 6, four discrete image cycles are shown, the first image cycle 60 consisting of Frames #1-#3, and represents a change of the pixel array from a blank display (Frame #1) to an image of the letter "A" (Frames #2 and #3). Similarly, the second image cycle 62 consists of Frames #4-#6, and represents a change of the array from the letter "A" (Frame #4) to an image of the letter "B" (Frames #5 and #6). The third image cycle 64, on the other hand, represents no change in the image from the previous second cycle, although the electrodes still pass through the voltage cycle.

As will be described below, the first frame of each cycle is an "Opaque" Frame (e.g., #1, #4, #7 and #10), followed by a second or "Transmissive" Frame (e.g., #2, #3, #8 and #11). The final frame in each "image" cycle is the "Hold" Frame (e.g., #3, #6, #9 and #12). Each frame of the "image" cycle is repeated over and over, in the same sequential order, for each pixel in the array and for each discrete image (e.g., Frames #2 and #3, #5 and #6, #8 and #9, and #11 and #12).

Briefly, in the "Opaque" Frames (e.g., #1, #4, #7 and #10), the "white" pixels $54_{CS}$ in the "PIXELS WRITTEN" Row represent only those selected pixels whose rotating elements 20 have changed state from the "Transmissive" state to the "Opaque" state. The "white" pixels $54_{NC}$ of the "second or "Transmissive" Frame (e.g., #2, #3, #8 and #11), on the other hand, represents only those selected pixels changing the state of the corresponding rotating elements 20 from the opaque state (e.g. 180°) to the transmissive state (90°). Collectively, the selected pixels $54_{CS}$ altered in the "Opaque" Frame, and those selected pixels $54_{CS}$ altered in the subsequent "transmissive" Frame (e.g., #1 and #2, or #4 and #5) combine to form the discrete image illustrated in the "RESULTS" Row.

With respect to the third or "Hold" Frame (e.g., #3, #6, #9 and #12), these frames represents a "Hold" state where each rotating element, be it in the "Opaque" state of the "Transmissive" state, is maintained in its current state. In particular, however, as will be described in greater detail below, the "white" pixel $54_{CS}$ just altered to the "Transmissive" state in the previous "Transmissive" Frame are maintained in the "Transmissive" state in the subsequent "Hold" Frame, but the voltage trace of the BP electrodes 46 for each is driven to an equal voltage potential with that of the BP electrodes 46 of each "Black" pixels $54_{NC}$. In this particular example, in each "Hold" state, the voltage at the corresponding BP electrodes of the "white" pixels $54_{CS}$ is driven from 0V to $+V_{BPE}$ (e.g., Frame #3 or #6). Consequently, the negative E-Field of these "white" pixels $54_{CS}$ in the "Transmissive" State (e.g. Frame #2) is changed to a 0 E-field, which essentially just maintains and holds the current state of the rotating element for that pixel. Importantly, however, this E-Field step up to a 0 E-field is necessary in order initiate the next image cycle. Without performing this intermediate "Hold" state function, it would be difficult for any of these transmissive "white" pixel $54_{CS}$, in the "Transmissive" Frame, to directly reach an "Opaque" state since a positive ΔE-Field change of 2E would result (i.e., going from a –E to a +E). As mentioned, such a larger electric field even if varied over a relatively slower Δt would still generate an orthogonal direction magnetic field that predominate the electric field, and hence, maintaining the rotating elements 20 of the "white" pixel $54_{CS}$ in the "Transmissive" state.

Figure 7A:
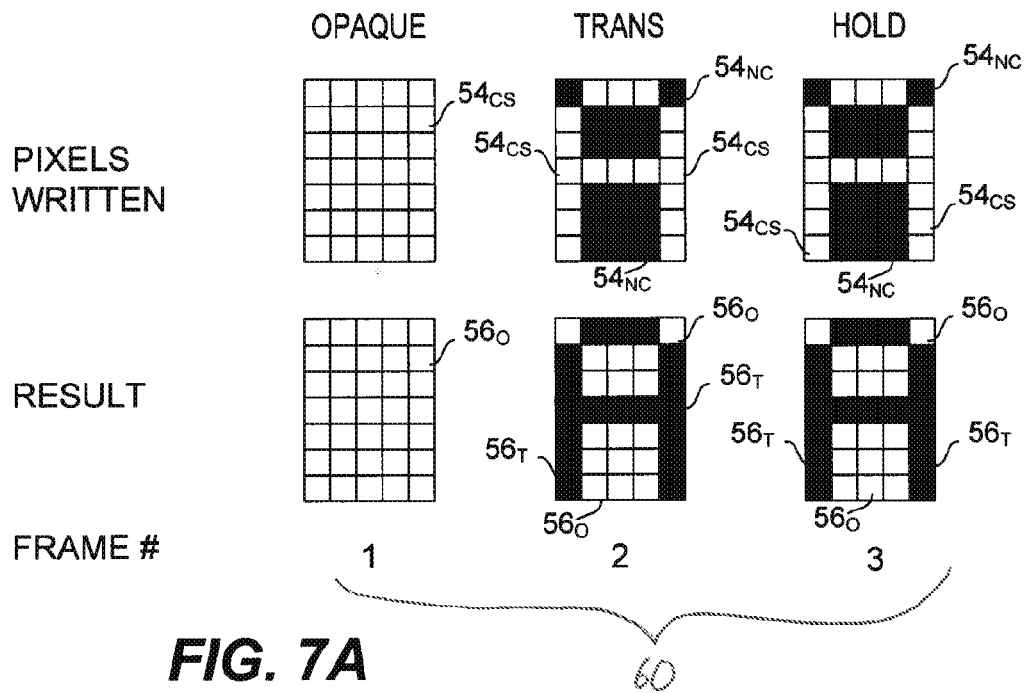
FIGS. 7A and 7B show an enlarged schematic diagram of FRAMES #1-#6 of the pixel display assembly of FIG. 6.

Referring back to Frame #1 of FIGS. 6 and 7A, as mentioned, this initial "Opaque" Frame represents an erasing, initializing or "blanking" of the screen where all the pixels of the array are either altered to the "Opaque" state or the "Transmissive" state. This initial start-up frame essentially resets the starting point of each pixel, blanking or writing the entire array of pixels in the display structure 30 to the "Opaque" state, in this particular embodiment. Essentially, the BP Electrode 46 of all the pixels 54 is driven to +V, while the voltage at the VCOM (ITO) electrode 40 is driven to 0V, generating (via, $E=\Delta V_{BPE}-\Delta V_{ITO}$) a positive E-Field across the entire display. For example, erasing or initializing the display image to all "opaque" (e.g., black) image involves applying 20 V to all of the back plane electrodes with reference to ITO electrode layer. Alternatively, erasing the display image to all black color may involve applying –20 V to all of the back plane electrodes with respect to the ITO layer. In this example, the total voltage drop in any pixel is never greater than 20V, but the bus carrying voltage must be able to handle the range of –20 V to +20 V. The ±20 V window is a suitable potential for organic semiconductor/conductor backplanes. When using other types of BP Electrodes, such as inorganic TFTs, for example, higher voltages (e.g., ±40 V) may be employed. For segmented circuit board back planes, one could use even higher voltages. It is expected that such voltages will generate a torque force sufficient to rotate the sphere.

In the "transparent" Frame #2 (i.e., going from Frame #1 to Frame #2), the FP VCOM (ITO) electrode 40 is driven from 0V to +V (i.e., a $\Delta V_{ITO}$ of +V). Simultaneously, the voltage of the BP Electrode 46 of each "White" pixel $54_{CS}$ in the "PIXELS WRITTEN" Row is simultaneously driven from +V to 0V (i.e., a $\Delta V_{BPE}$ of –V), creating a larger magnitude negative E-Field (i.e., a change in White E-field from +E to –E or –2E) across the respective rotating element 20. In effect, the magnitude of the E-field has changed by a factor of two, even though the voltage has changed only by a factor of one.

As previously mentioned, when a larger ΔE-Field change (e.g., at least about ±2E) from one Frame to the next Frame varies over a relatively rapid time span (i.e., Δt), a predominating, localized magnetic force (proportional to the equation ΔE/Δt) is induced across the selected pixels in a direction extending substantially perpendicular to the panel face. This causes the conductively coated rotating element 20, on one hemisphere 23, to align with the magnetic field, in the "transmissive" state. Accordingly, in the "transmissive" Frame #2, the selected "white" pixels $54_{CS}$ in the PIXELS WRITTEN" Row are changed from the "opaque" state to the "transmissive" state, as represented by the "black" $56_T$, or "transmissive" pixels, in the RESULT Row.

In contrast, still referring to "transmissive" Frame #2, the selected "black" pixels $54_{NC}$ in the PIXELS WRITTEN Row are maintained in their previous "Opaque" state from Frame #1. For those selected pixels $54_{NC}$, as mentioned, the voltage of the corresponding BP Electrodes 46 minors that of the large common Front Plane Electrode 40 (i.e., driving the voltage of the VCOM (ITO) from 0 to +V) resulting in a 0V Black E-Field (i.e., ($V_{BPE}-V_{ITO}$)) across the "Black" pixels $54_{NC}$ in the PIXELS WRITTEN" Row. In this instance, since the entire pixel array was originally blanked, and reset to an "opaque" state, those "Black" pixels $54_{NC}$ in the PIXELS WRITTEN" Row of Frame #2 are maintained in the "opaque" state. Simultaneously, as mentioned above, those selected "White" pixels $54_{CS}$ in the PIXELS WRITTEN" Row of Frame #2 have changed from the "Opaque" state the "Transmissive" state, forming an "A" image in "RESULTS" Row.

Incidentally, since each "Black" pixels $54_{NC}$ in the all the Frames (i.e., #1-#12) of the "PIXELS WRITTEN" Row represent those pixels where no change of state has occurred for their respective rotating element, the resulting E-Field across the rotating element is 0 ΔV. Accordingly, as shown in the timing diagrams of FIG. 6, the voltage trace of the BP Electrodes 46 of the "Black" pixels $54_{NC}$ essentially mirrors that of the common Front Plane Electrode 40 (i.e., the VCOM (ITO)). Consequently, a 0 E-field is generated across each selected "Black" $54_{NC}$, in each Frame, maintaining the same in its current state. Accordingly, the timing diagrams of the "Black" pixels will not be further described.

To complete the first image cycle 60, in the "Hold" Frame #3, the "White" E-Field between the transmissive "White" pixels $54_{CS}$ in the PIXELS WRITTEN" Row of the previous "Transmissive" Frame #2, are driven from –E to 0E. As mentioned, in one specific example, this intermediate "Hold" state function is necessary since it would be difficult for any of these transmissive "white" pixel $54_{CS}$, in the "Transmissive" Frame, to directly reach an "Opaque" state (i.e., requiring a positive ΔE-Field change of 2E, going from a –E to a +E). As mentioned above, such a larger electric field even if varied over a relatively slower Δt would still generate an orthogonal direction magnetic field that predominates the electric field, thus, maintaining the rotating elements 20 of the "white" pixel $54_{CS}$ in the "Transmissive" state.

Figure 7B:
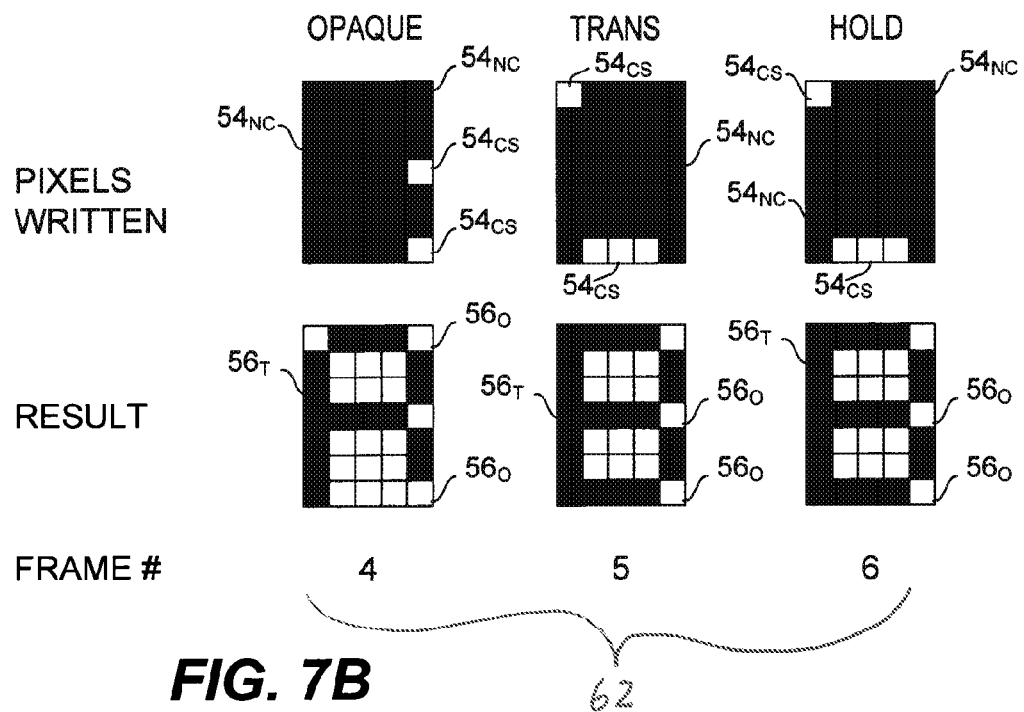

Transitioning from the "hold" Frame #3 of the first image cycle 60 to the "Opaque" Frame #4, the second image cycle (i.e., Frames #4-#6) is commenced. In this example, as shown in the "Result" Row of FIGS. 6, 7A and 7B, the resulting image transitions from an image of the letter "A" to an image of the letter "B". As previously mentioned, for all "Opaque" Frames, the selected "White" pixels $54_{CS}$ in the "PIXELS WRITTEN" Row are changed from the "Transmissive" state to the "Opaque" state. In this instance, as shown in the "PIXELS WRITTEN" Row of Frame #4, only two pixels $54_{CS}$ fall into this category.

Viewing the corresponding timing diagram of FIG. 6 from the transition from the "hold" Frame #3 to the "Opaque" Frame #4, the voltage of the VCOM (ITO) electrode 40 is driven from +V to 0, while the BP Electrodes 46 of the "White" pixels $54_{CS}$ of the "PIXELS WRITTEN" Row are maintained at +V. The resulting $E=\Delta V_{BPE}-\Delta V_{ITO}$ yields a positive +1EV magnitude E-Field between the VCOM (ITO) electrode 40 and the BP electrodes 46 of the selected pixels $54_{CS}$. As previously mentioned, this lower magnitude electric field is sufficient commence alignment of those "white" pixels $54_{CS}$ in the PIXELS WRITTEN" Row from the transmissive state back to the opaque state. Referring to Frame #4 of FIG. 7B, in the "RESULT" Row, those same "White" pixels $54_{CS}$ that changed state in the "PIXELS WRITTEN" Row are now illustrated as in the "opaque" state.

The complete the transition of the image of the letter "A" to the letter "B", the image cycles from "Opaque" Frame #4 to "Transmissive" Frame #5. Referring again to the timing diagram, the FP VCOM (ITO) electrode 40 is driven from 0V to +V (i.e., a $\Delta V_{ITO}$ of +V). Simultaneously, the voltage of the BP Electrode 46 of four "White" pixel $54_{CS}$ (in Frame #5) in the "PIXELS WRITTEN" Row is simultaneously driven from +V to 0V (i.e., a $\Delta V_{BPE}$ of –V), creating a larger magnitude negative E-Field (i.e., a change in White E-field from +E to –E or –2E) across the respective rotating element 20. This causes the conductively coated rotating element 20, on one hemisphere 23, to align with the magnetic field generated in an orthogonal direction to the E-field, in the "transmissive" state. Accordingly, in the "transmissive" Frame #5, the four selected "white" pixels $54_{CS}$ in the PIXELS WRITTEN" Row (FIG. 7B) are changed from the "opaque" state to the "transmissive" state, as represented by the "black" pixels 54, or "transmissive" pixels, in the RESULT Row.

To complete the second image cycle 62, the transmissive "White" pixels $54_{CS}$, in the PIXELS WRITTEN" Row of the previous "Transmissive" Frame #5 are driven from –E to 0E, in the "Hold" Frame #6. As mentioned, in one specific example, this intermediate "Hold" state function is necessary since it would be difficult for any of these transmissive "white" pixel $54_{CS}$, in the "Transmissive" Frame, to directly reach an "Opaque" state (i.e., requiring a positive ΔE-Field change of 2E, going from a –E to a +E).

If desired, it is possible to produce a gray image, or shades of gray. A gray image can be produced, for example, if selected spheres are not completely rotated to either the 180° "Opaque" orientation (i.e., the white colored pixels $56_O$ in FIG. 7, and sphere $20_O$ in FIGS. 2 and 3) or to the 90° "Transmissive" orientation (i.e., the black colored pixels $56_T$ in FIG. 7, and spheres $20_M$ in FIGS. 2 and 3). In this case the viewer will see less than one transmissive hemisphere and of more of the black or opaque hemispherical white surface of individual spheres, so that an impression of gray color will be created.

Incomplete rotations of the spheres can be achieved by applying smaller voltages than those needed for 180° rotation or by applying voltage in pulses of short duration, e.g., by pulse width modulation (PWM) methods. Other methods of creating gray images can be used as will be recognized by those skilled in the art. These methods are applicable not only for creating gray images, when black and white hemispherically coated spheres are used, but they can be also employed to rotate a multi-colored sphere to a specific degree that is different from 180°. For example spheres having quadrants or thirds of different color can be rotated by 45° or 135° by using pulse width modulation methods.

Other Embodiments

It is understood that the examples and embodiments described herein are for illustrative purposes only and that various modifications or changes in light thereof will be suggested to persons skilled in the art. Although various details have been omitted for clarity's sake, various design alternatives may be implemented. Therefore, the present examples are to be considered as illustrative and not restrictive, and the invention is not to be limited to the details given herein, but may be modified within the scope of the appended claims.

Figure 8:
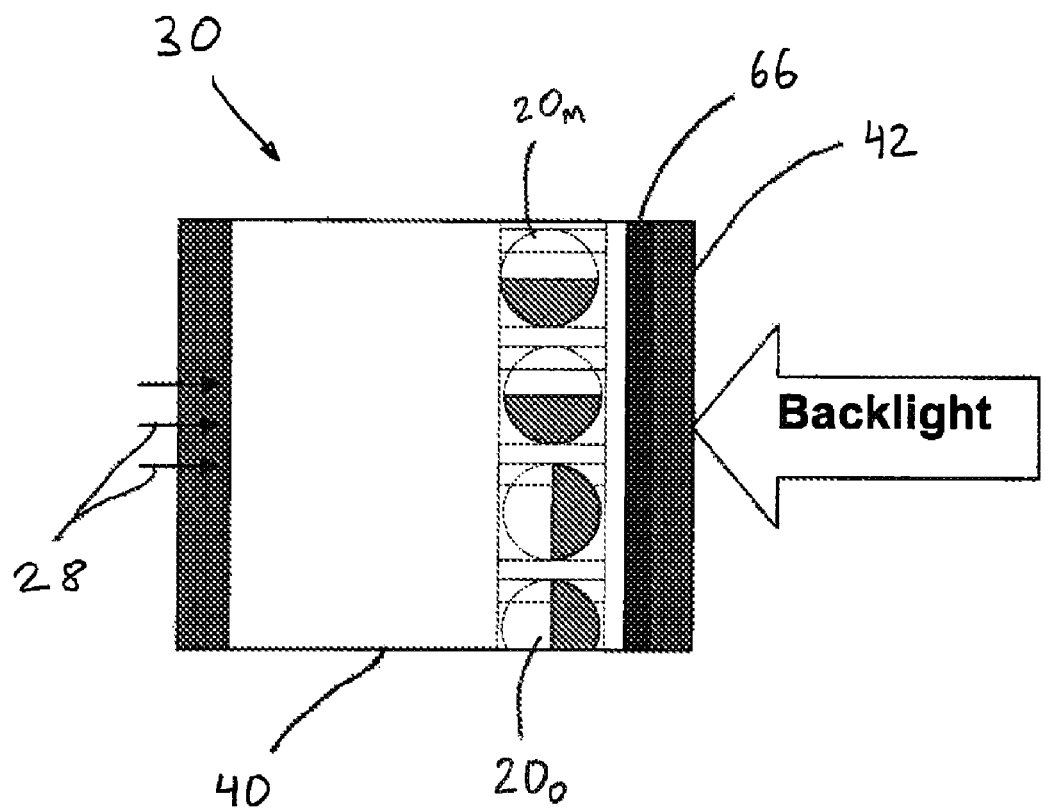
FIG. 8 illustrates a cross-sectional side elevation view of an alternative embodiment element display incorporating a color filter.

For example, as best viewed in FIG. 8, which illustrates a cross-section of an electro-optic display 30, conventional color filter-type technology may be employed. In this configuration, one or more color filter devices 66 can be disposed substantially adjacent the back plane element 42, color filtering the back lighting before it is passes through the respective rotating spheres $20_M$ oriented in the "Transmissive" state. While it is advantageous for some applications that electro-optic displays possess bistability, in other embodiments (e.g., in embodiments directed to video applications), the displays of present invention may not necessarily be bistable. Further, while transmissive displays were primarily described in the examples provided in the detailed description, it should be realized that the displays of present invention are not limited to transmissive displays and can also include displays that may be of the reflectance type.

What is claimed is:
1. A transmissive display assembly comprising:
a substantially transparent back plane element having a plurality of electrodes distributed in two dimensions on the backplane, each said electrode allowing independent control of a discrete region of the display;
a substantially transparent front plane element disposed substantially parallel and adjacent said backplane element, said front plane element including at least one electrode disposed opposite said back plane, said front plane element being spaced apart from said back plane element by an interior wall defining a plurality of cells forming a single layer of cells therebetween;

a plurality of two-segment optically anisotropic elements rotatably disposed in said plurality of cells in a single layer, wherein the two-segment optically anisotropic elements comprise a core and a partial conductive coating, wherein said partial conductive coating comprises conductive particles and renders the optically anisotropic elements responsive to a magnetic field and rotatable by about 90±15 degrees upon application of the magnetic field, and wherein said partial conductive coating further provides electrical anisotropy to the optically anisotropic elements and renders the optically anisotropic elements responsive to an electric field and rotatable by about 180±15 degrees upon application of the electric field; and a fluid provided in said cells, such that said anisotropic elements can rotate between a first orientation and a second orientation within their respective cells when an electric field or a magnetic field is applied to the cells.

2. The display assembly according to claim 1, wherein said partial conductive coating is opaque, and wherein the core is substantially transparent.

3. The display assembly according to claim 2, wherein said opaque partial conductive coating comprises carbon black.

4. The display assembly according to claim 3, wherein said partial conductive coating is a hemispherical coating.

5. The display assembly according to claim 1, wherein the front plane electrode and each of the plurality of back plane electrodes are configured to selectively cooperate to generate a magnetic field, in a "first" state, across a corresponding cell in a manner inducing a response to a magnetic field that orients the corresponding rotating element in the first orientation.

6. The display assembly according to claim 5, wherein the front plane electrode and each of the plurality of back plane electrodes are configured to selectively cooperate to generate an electric field, in a "second" state, across each cell in a manner inducing a response to an electric field that orients the corresponding rotating element in the second orientation.

7. The display assembly according to claim 6, wherein the "first" state corresponds to a "transmissive" state wherein the respective rotating anisotropic element is oriented to permit the passage of backlight therethrough from the back plane electrode to the front plane electrode of the display assembly, and the "second" state corresponds to an "opaque" state wherein the respective rotating anisotropic element is oriented to substantially prevent the passage of backlight therethrough from the back plane electrode to the front plane electrode of the display assembly.

8. The display assembly according to claim 1, wherein the rotating anisotropic elements are spherical.

9. The display assembly according to claim 1, wherein said conductive coating comprises carbon black at a concentration of between about 5% and 80% by weight.

10. The display assembly according to claim 1, wherein said particles are carbon black.

11. The display assembly according to claim 8, wherein the spheres have an average diameter of between about 25 and 150 micrometers.

12. The display assembly according to claim 8, wherein at least perimetrically, said rotating elements each include a substantially transparent hemisphere on one side, and a substantially opaque hemisphere on the opposite side, said transparent hemisphere and said opaque hemisphere intersecting along a corresponding edge substantially contained in a respective intersecting plane.

13. The display assembly according to claim 12, wherein in the first orientation, the intersecting plane of each respective rotating element is oriented substantially perpendicular to the front plane electrode, and in the second orientation, the intersecting plane of each respective rotating element is oriented substantially parallel to the front plane electrode.

14. The display assembly according to claim 13, wherein each rotating anisotropic element includes a substantially transparent core that is partially coated with a substantially opaque coating.

15. The display assembly according to claim 14, wherein the front plane electrode and each of the plurality of back plane electrodes are configured to selectively cooperate to generate a magnetic field, in a "first" state, across a corresponding cell in a manner inducing a conductively anisotropic response that orients the corresponding rotating element in the first orientation.

16. The display assembly according to claim 15, wherein the front plane electrode and each of the plurality of back plane electrodes are configured to selectively cooperate to generate an electric field, in a "second" state, across each cell in a manner inducing an electrically anisotropic response that orients the corresponding rotating element in the second orientation.

17. The display assembly according to claim 16, wherein the "first" state corresponds to a "transmissive" state wherein the respective rotating anisotropic element is oriented to permit the passage of backlight therethrough from the back plane electrode to the front plane electrode of the display assembly, and the "second" state corresponds to an "opaque" state wherein the respective rotating anisotropic element is oriented to substantially prevent the passage of backlight therethrough from the back plane electrode to the front plane electrode of the display assembly.

18. A method of using a rotating element display assembly, the method comprising:

(a) providing a display assembly comprising:

(i) a substantially transparent back plane element having a plurality of electrodes distributed in two dimensions on the backplane, each said electrode allowing independent control of a discrete region of the display;

(ii) a substantially transparent front plane element disposed substantially parallel and adjacent said back plane element, said front plane element including at least one electrode disposed opposite said back plane, said front plane element being spaced apart from said back plane element by an interior wall defining a plurality of cells forming a single layer of cells therebetween;

(iii) a plurality of two-segment optically anisotropic elements rotatably disposed in said plurality of cells in a single layer, wherein the two-segment optically anisotropic elements comprise a core and a partial conductive coating, wherein said partial conductive coating comprises conductive particles and renders the optically anisotropic elements responsive to a magnetic field and rotatable by about 90±15 degrees upon application of the magnetic field, and wherein said partial conductive coating further provides electrical anisotropy to the optically anisotropic elements and renders the optically anisotropic elements responsive to an electric field and rotatable by about 180±15 degrees upon application of the electric field; and (iv) a fluid provided in said cells, such that said anisotropic elements can rotate between a first orientation and a second orientation within their respective cells when an electric field or a magnetic field is applied to the cells;

(b) providing a plurality of signals to at least some of the electrodes of the display;

(c) creating a potential difference between said electrodes in response to said signals; and (d) rotating at least some of the anisotropic elements between the first orientation and the second orientation in response to said potential difference.

* * * * *